(12) United States Patent
Snyker et al.

(10) Patent No.: US 8,975,789 B2
(45) Date of Patent: *Mar. 10, 2015

(54) ELECTRICAL CONNECTIVITY WITHIN ARCHITECTURAL GLAZING FRAME SYSTEMS

(71) Applicant: SAGE Electrochromics, Inc., Faribault, MN (US)

(72) Inventors: Mark O. Snyker, Apple Valley, MN (US); Bryan D. Greer, Northfield, MN (US)

(73) Assignee: SAGE Electrochromics, Inc., Faribault, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 14/056,399

(22) Filed: Oct. 17, 2013

(65) Prior Publication Data

US 2014/0041933 A1 Feb. 13, 2014

Related U.S. Application Data

(63) Continuation of application No. 13/610,143, filed on Sep. 11, 2012.

(60) Provisional application No. 61/589,024, filed on Jan. 20, 2012.

(51) Int. Cl.
| | | |
|---|---|---|
| *H01B 7/30* | (2006.01) | |
| *G02F 1/153* | (2006.01) | |
| *G02F 1/161* | (2006.01) | |
| *H02G 3/30* | (2006.01) | |

(Continued)

(52) U.S. Cl.
CPC .......... *H02G 3/30* (2013.01); *E06B 2009/2464* (2013.01); *G02F 1/1533* (2013.01); *G02F 1/161* (2013.01); *G02F 2201/42* (2013.01); *H04B 5/0037* (2013.01)
USPC .......................................................... 307/147

(58) Field of Classification Search
USPC .......................................................... 307/147
See application file for complete search history.

(56) References Cited

U.S. PATENT DOCUMENTS

| | | |
|---|---|---|
| 5,640,274 A | 6/1997 | Iwama et al. |
| 5,889,608 A | 3/1999 | Buffat et al. |

(Continued)

FOREIGN PATENT DOCUMENTS

| | | |
|---|---|---|
| CN | 201789862 U | 4/2011 |
| DE | 10315188 A1 | 3/2004 |

(Continued)

OTHER PUBLICATIONS

International Search Report and Written Opinion for Application No. PCT/US2013/022134 dated Aug. 21, 2013.

*Primary Examiner* — Robert L. Deberadinis
(74) *Attorney, Agent, or Firm* — Robert N. Young

(57) ABSTRACT

A system for providing an electrical interface across a sealed boundary may include a frame in sealed engagement with at least a portion of a substrate. The substrate may be in communication with an electrochromic device. The system may further include first and second conduits. The first conduit may be on a first side of the substrate and a second conduit may be on a second side of the substrate. The second conduit may be in communication with the first conduit through at least one of the seal, a space between the seal and the frame, and a space between the seal and the substrate.

19 Claims, 19 Drawing Sheets

(51) Int. Cl.
*H04B 5/00* (2006.01)
*E06B 9/24* (2006.01)

(56) References Cited

U.S. PATENT DOCUMENTS

| | | | |
|---|---|---|---|
| 6,369,935 | B1 | 4/2002 | Cardinal et al. |
| 7,872,791 | B2 | 1/2011 | Karmhag et al. |
| 2004/0061920 | A1 | 4/2004 | Tonar et al. |
| 2012/0194895 | A1 | 8/2012 | Podbelski et al. |
| 2013/0157493 | A1 | 6/2013 | Brown |
| 2013/0241299 | A1* | 9/2013 | Snyker et al. ................. 307/104 |

FOREIGN PATENT DOCUMENTS

| | | |
|---|---|---|
| EP | 1962133 A2 | 8/2008 |
| WO | 2012102964 A1 | 8/2012 |

* cited by examiner

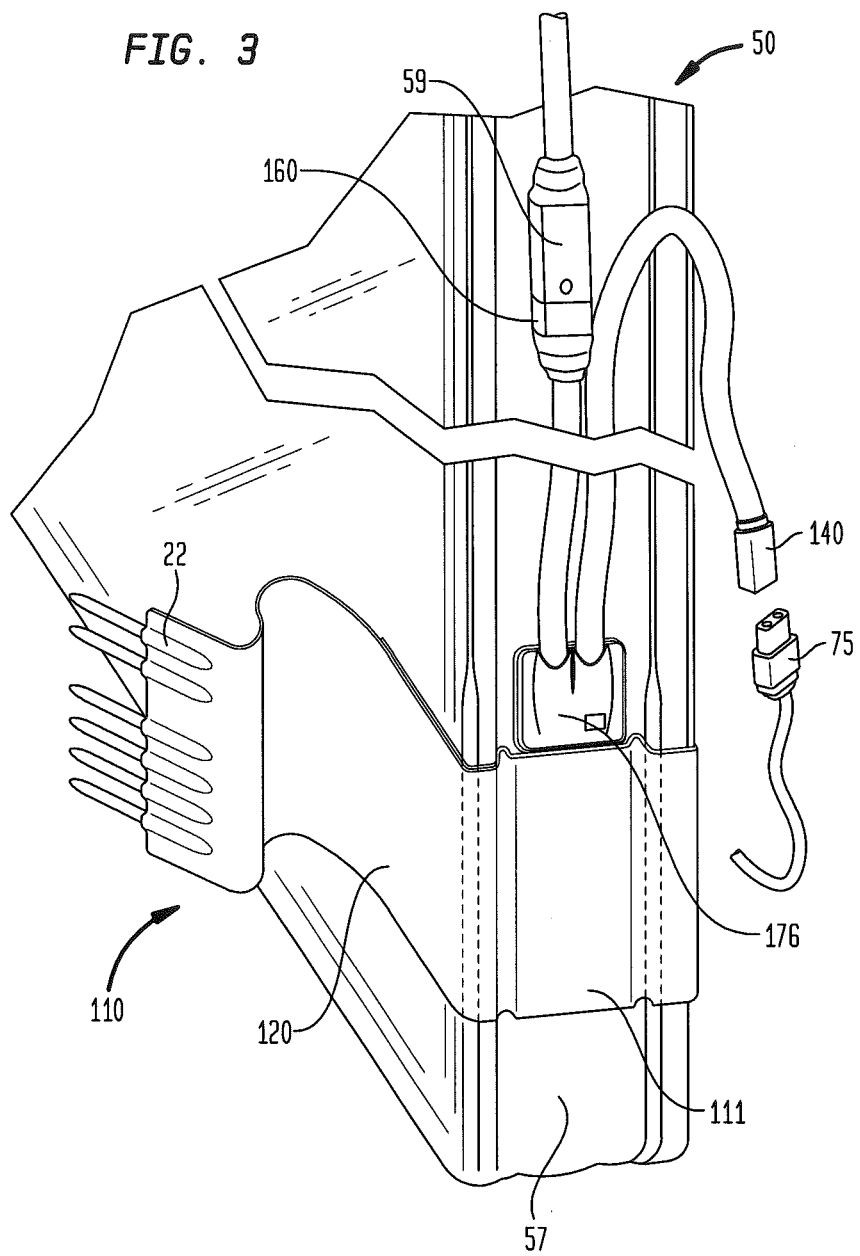

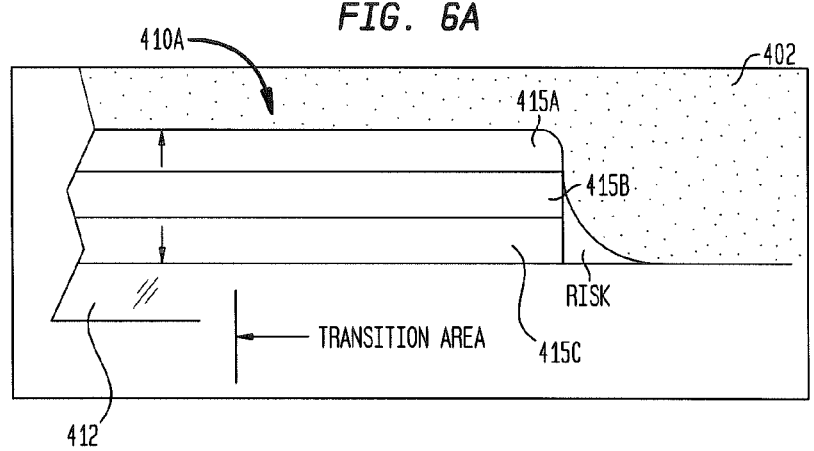
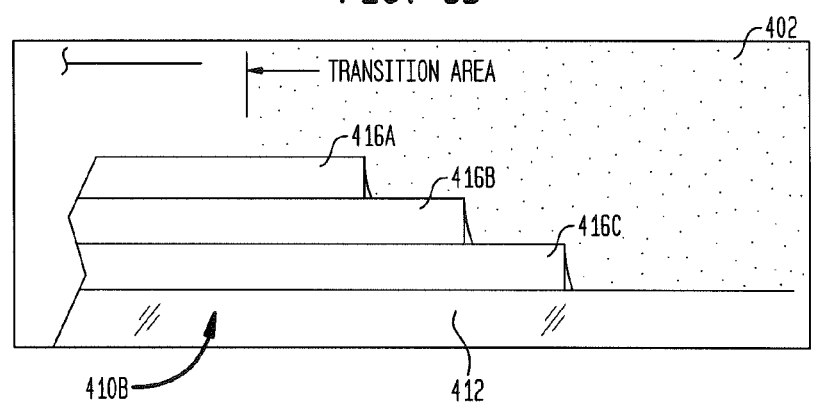
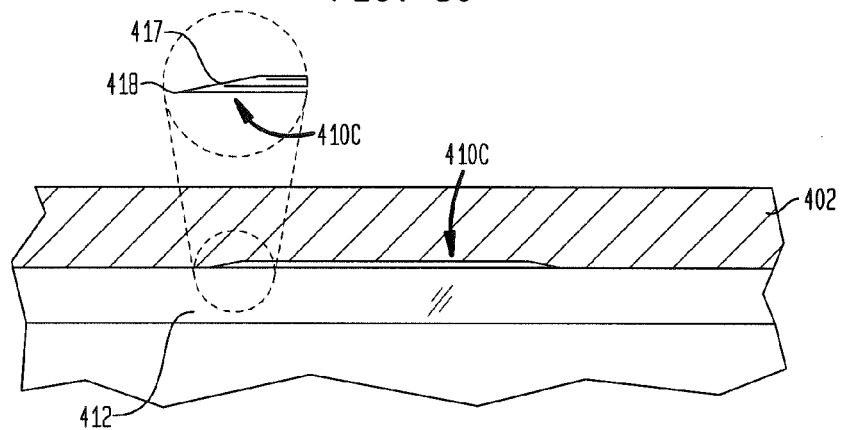

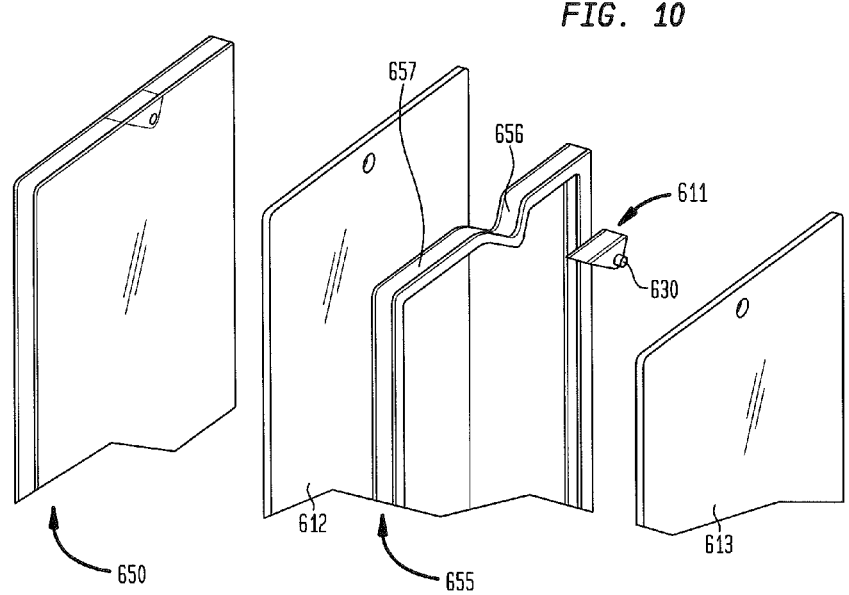

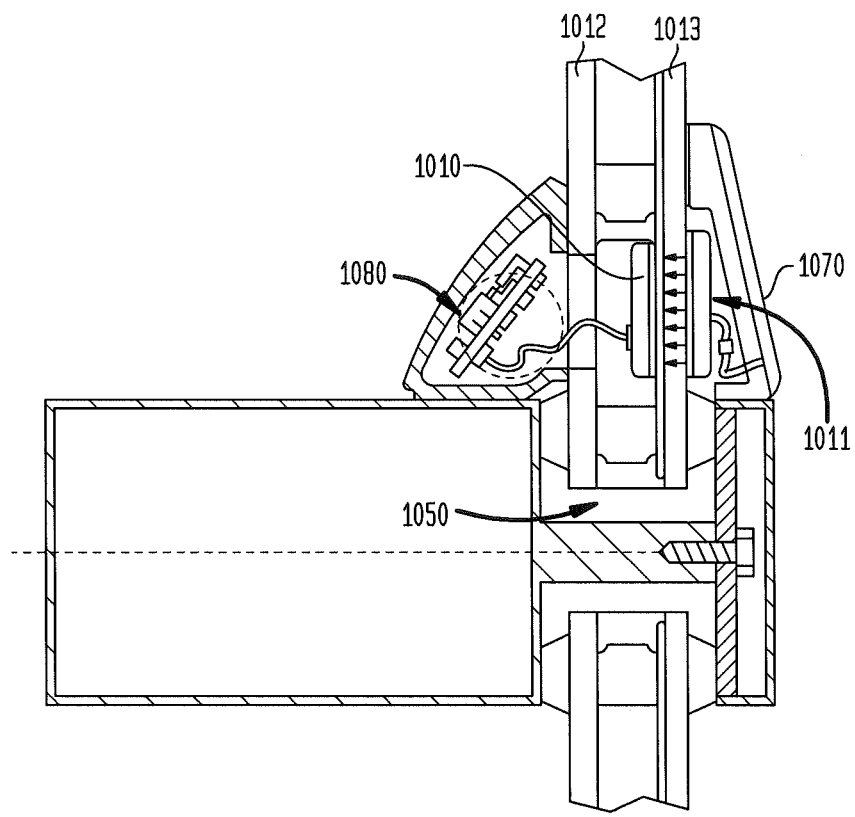

ELECTRICAL CONNECTIVITY WITHIN ARCHITECTURAL GLAZING FRAME SYSTEMS

CROSS-REFERENCE TO RELATED APPLICATIONS

The present application is a continuation of U.S. patent application Ser. No. 13/610,143 filed Sep. 11, 2012, which claims the benefit of the filing date of U.S. Provisional Patent Application No. 61/589,024 filed Jan. 20, 2012, the disclosures of which are hereby incorporated herein by reference.

FIELD OF THE INVENTION

The present invention relates to architectural glazing frame systems and more particularly to electrical connectivity within architectural glazing frame systems.

BACKGROUND OF THE INVENTION

Insulated glass units (IGUs) include opposing glass lite panels separated by a spacer along the edge in which the spacer and the glass sheets create a seal around a dead air space (or other gas, e.g. argon, nitrogen, krypton). A series of thin films, known as electrochromic glazings, are applied or deposited to one of the glass lite panels. Electrochromic glazings include electrochromic materials that are known to change their optical properties in response to the application of an electric potential. Common uses for these glazings include architectural windows, as well as windshields and mirrors of automobiles. Further details regarding the formation of IGUs can be found in, for example, U.S. Pat. Nos. 7,372,610; 7,593,154; and U.S. Pat. Appl. Publ. No. 2011/0261429 A1, the entire disclosures of which are hereby incorporated by reference herein.

IGUs may be installed in buildings as part of architectural glazing frame systems, which conventionally include a window pane and frame-work often having a frame cap on the exterior of the frame. It is necessary to bring electrical connections outside of the framing system in order to connect electronic controls, such as lighting and environmental controls or other control systems, to the IGUs.

Previous systems known to those of ordinary skill in the art have run wires to the edges of the frames within the framing systems. For instance, as shown in FIG. 1, an insulated glass unit 50 may be supported by a frame 1 on one side and a combination of a pressure wall clamp plate 9A and a pressure wall trim cap 9B on the other side. An IGU connector 7 may be connected to the insulated glass unit 50 within a "glazing pocket" region enclosed by (i) an inner seal 2 between the frame 1 and an inner glass lite 12, (ii) the IGU 50, (iii) an outer seal 3 between the pressure wall clamp plate 9A and the outer glass lite 13, (iv) a wall seal 8 between the frame 1 and the pressure wall clamp plate 9A, and (v) a spacer 5 around the perimeter of and between the glass lites 12 and 13. To connect the IGU connector 7 to other electrical interfaces, a hole 6 has been drilled within a wall of the frame 1 to enable a cable 4 or other electrical conductor to pass through the hole and into a space of the frame from which the cable 4 can travel to other locations within the framing system. Such wire routing systems are believed to be expensive and potentially error prone, often requiring the use of not only a technician for installing the IGUs, but also electricians for the wire routing and potentially structural engineers due to the modifications made to the framing system. Furthermore, these wire routing systems often require customization due to the variety of commercial and residential framing systems in use today.

It is believed that advances in wireless communications and solar power control systems may be useful in providing a reduction in the overall wiring complexity for systems utilizing electrically active glazes, such as those described in co-pending U.S. Provisional Application No. 61/435,391 and U.S. Pat. No. 6,055,089, the disclosures of which are hereby incorporated by reference herein in their entirety. Wiring however may still be required to connect the IGUs locally to photovoltaic (PV) panels, power packs or batteries, and control units lying on either the interior or exterior of a building.

BRIEF SUMMARY OF THE INVENTION

In accordance with an aspect of the invention, a system for providing an electrical interface across a sealed boundary may include a frame in sealed engagement with at least a portion of a substrate. The substrate may be in communication with an electrochromic device. The system may include first and second conduits in which the first conduit may be on a first side of the substrate and a second conduit may be on a second side of the substrate. The second conduit may be in communication with the first conduit through at least one of (i) the seal, (ii) a space between the seal and the frame, and (iii) a space between the seal and the substrate.

In some embodiments, the frame may be in sealed engagement with the substrate through first and second seals on both the first and second sides of the substrate in which the second conduit may be nearest to the second seal. The first conduit is in communication with the second conduit through any of (i) the first and second seals, (ii) spaces between each of the first and second seals and the frame, and (iii) spaces between each of the first and second seals and the substrate, the first conduit being nearest to the first seal.

In some embodiments, the first and second conduits may be ends of a connectivity harness. In some embodiments, the system may include at least one conduit cable. In such embodiments, at least one of the first and second conduits may form at least an end portion of the conduit cable. In some embodiments, the system may include at least one conduit cable in sealed engagement with one of the first and second seals. In some embodiments, the substrate may have a recess at a portion of the perimeter of the substrate. The recess may be adapted for engagement with the conduit cable in which the conduit cable may be in sealed engagement with the first and second seals at the substrate recess.

In some embodiments, the system may include two conduit cables. In such embodiments, each of the conduit cables may pass through one of (i) the respective first or second seal, (ii) the space between the respective first or second seal and the frame, and (iii) the space between the respective first or second seal and the substrate.

In some embodiments, the conduit cable may be a flexible ribbon cable. In some embodiments, the flexible ribbon cable may have a thickness ranging from about 0.035 to about 0.040 inches across a width of the cable. In some embodiments, the conduit cable may be a flexible printed circuit. In some embodiments, the flexible printed circuit may be substantially flat. In such embodiments, the flexible printed circuit may have a consistent thickness ranging from about 0.008 to about 0.015 inches across a width of the cable. In some embodiments, the conduit cable may be formed of multiple layers. In some embodiments, the conduit cable may include a stepped edge. In some embodiments, the conduit cable may have a tapered edge on an end of the cable. In some embodiments, the tapered edge may include a tip at an extremity of the edge in which the tip of the tapered edge may be in sealed engagement with the substrate.

In some embodiments, the first and second conduits may be connected through a connectivity module. In some embodiments, the connectivity module may be connected to the electrochromic device through a cable connection. In some embodiments, the connectivity module may be connected to the electrochromic device through a connector socket extending from the connectivity module.

In accordance with another aspect of the invention, a system for providing an electrical interface across a sealed boundary may include a frame in sealed engagement along at least a portion of a substrate. The substrate may be in communication with an electrochromic device. The system may include first and second conduits in which the first conduit may be on a first side of the substrate and a second conduit may be on the second side of the substrate. The second conduit may be in communication with the first conduit through a hole in the substrate. In some embodiments, the system may include a connectivity module adapted for connection to the electrochromic device and having (i) a hole for receiving at least one electrical element for connecting the first and second conduits or (ii) opposing first and second connectors for receiving electrical elements in electrical communication with the first and second conduits, respectively.

In accordance with another aspect of the invention, a system for providing an electrical interface across a sealed boundary may include a frame in sealed engagement along at least a portion of first and second plates separated by a space in which each of the plates may be in communication with an electrochromic device. The system may include first and second conduits in which the first conduit may be an electrical conductor applied to the first plate, and the second conduit may be an electrical conductor applied to the second plate. The second conduit may be in communication with the first conduit across the space.

In some embodiments, the first and second conduits may be conductive bus bars wrapped around an edge of the respective first and second plates so as to have ends on opposing sides of the plates. In some embodiments, the system may include at least one electrical connector for attachment and electrical connection with at least one mating electrical connector. The electrical connector may extend from at least one of the first and second conduits on a side of the respective plate opposite the space.

In accordance with another aspect of the invention, a system for providing an electrical interface with moveable barriers may include a frame, a moveable barrier in mating engagement with the frame, a first communication module attached to the frame, and a second communication module attached to the moveable barrier. The second communication module may be in wireless communication with the first communication module. In some embodiments, the moveable barrier may be either a sliding window or an articulating window. In some embodiments, the wireless signal may confirm that the window is open or that the window is closed.

In accordance with another aspect of the invention, a system for providing an electrical interface between components outside of a building and components inside of a building in which a portion of the building is enclosed by at least one insulated glass unit having first and second glass substrates and an electrochromic device attached between the glass substrates may include a building frame in sealed engagement with first and second opposing sides of the glass substrates along a length of the substrates through seals simultaneously engaged with the frame and the substrate. They system may include at least a first conduit on the first opposing side of the first glass substrate. The first conduit may be at least one of (i) a flexible ribbon cable, (ii) a flexible printed circuit cable, and (iii) a conventional wire cable. The first conduit may be adapted for connection to a photovoltaic panel connector head on one end and a central connector on an opposite end. The first conduit may be configured to transmit or receive an electrical signal. The system may include at least a second conduit on the second opposing side of the second glass substrate. The second conduit may be at least one of (i) a flexible ribbon cable, (ii) a flexible printed circuit cable, and (iii) a conventional wire cable. The second conduit may be adapted for connection to an electronic control unit on one end and the central connector on an opposite end. The second conduit may be configured to transmit an electrical signal to, or receive an electrical signal from, the first conduit through at least one of (i) said seals, (ii) a space between said seals and said frame, and (iii) a space between said seals and said substrates. The central connector may contact at least a portion of outer faces of the first and second glass substrates in which the outer faces may be adjacent to the first and second opposing sides. The central connector may have a width with tapered edges at each end of the width. Such tapered edges may be adapted to contact the outer faces such that the central connector substantially forms a seal along the width of the central connector with both of the outer faces.

BRIEF DESCRIPTION OF THE DRAWINGS

FIG. 3 is a detailed perspective view of a connectivity harness engaged with an insulated glass unit in accordance with an embodiment of the invention.

FIG. 6A is a cross-sectional side view of a portion of a connectivity harness.

FIG. 6B is a cross-sectional side view of a portion of a connectivity harness in accordance with an embodiment of the invention.

FIG. 6C is a cross-sectional side view of a portion of a connectivity harness in accordance with an embodiment of the invention.

FIG. 10 shows exploded and perspective views of a portion of an insulated glass unit having a connectivity module connected thereto in accordance with an embodiment of the invention.

FIG. 14 is a cross-sectional side view of a system for providing an electrical interface across a sealed boundary of an architectural glazing frame system in accordance with an embodiment of the invention.

DETAILED DESCRIPTION

Figure 2A:
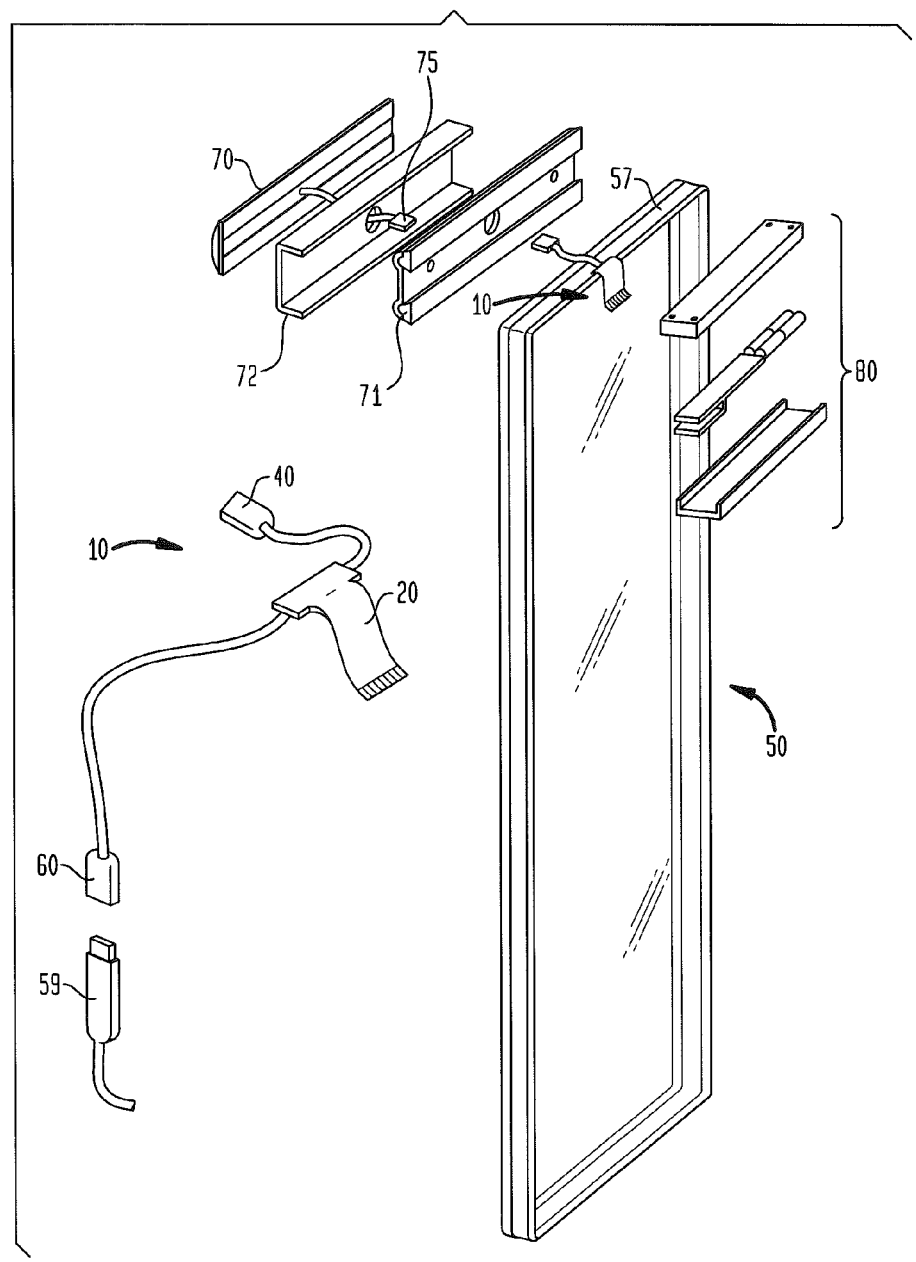
FIG. 2A is an exploded view of a portion of a system for providing an electrical interface across a sealed boundary of an architectural glazing frame system in accordance with an embodiment of the invention.
Figure 2B:
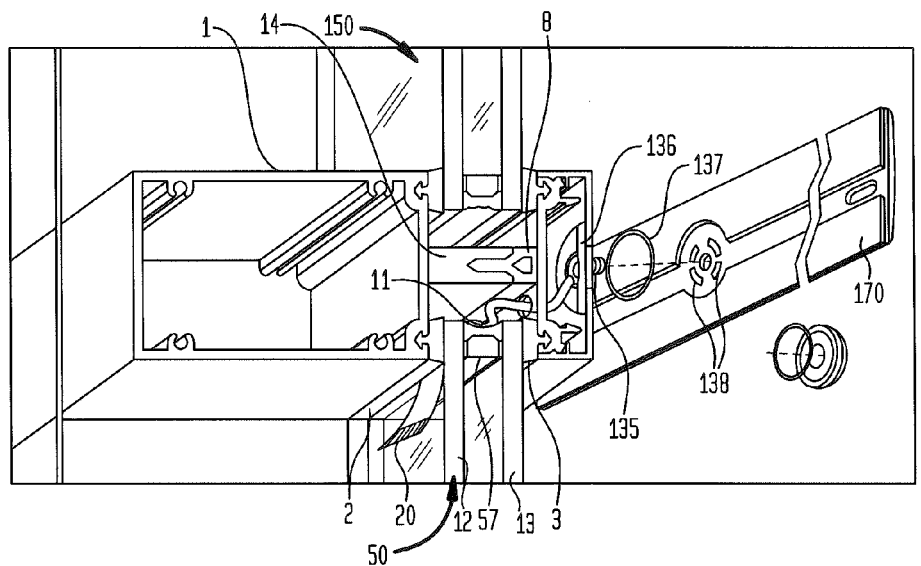
FIG. 2B is a perspective view of the system of FIG. 2A attached to a frame in which the photovoltaic panel and connections thereof shown in an exploded view.
Figure 2C:
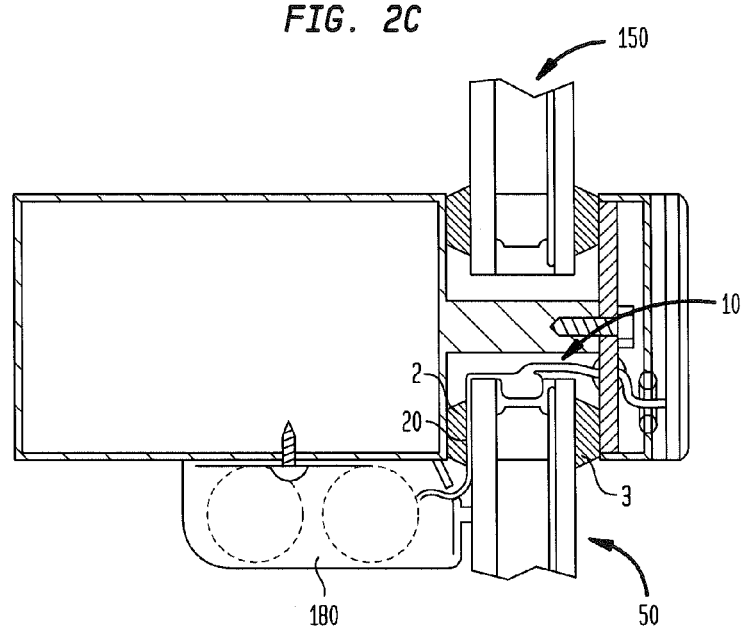
FIG. 2C is a cross-sectional side view of the system of FIG. 2A in which an end of a conduit cable is attached to an on-frame controller module.

Referring to FIGS. 2A-2C, in accordance with one embodiment of the present invention, a connectivity harness 10 may be connected to the IGU 50 along a portion thereof. As shown, the connectivity harness 10 has a central connectivity module 11 for routing electrical signals between a conduit cable 20, a panel connector 40, and an IGU connector 60. The connectivity module 11 may be placed at a portion of an insulator 57. The insulator may be made of a dielectric material including, but not limited to, silicone and is provided or applied such that it surrounds the perimeter of the IGU 50. The conduit cable 20 may extend from the connectivity module 11 around the inner glass lite 12 and between the inner seal 2 and the inner glass lite 12.

In this example frame systems shown in FIGS. 2A-2C, the frame 1 within an interior of a building may be in sealed engagement with the inner seal 2 of the IGU 50. The frame 1 may further have a protruding member 14 in sealed engagement with the wall seal 8 between the IGU 50 and an adjacent IGU 150. On a side of the IGU 50 opposite the frame 1, an inner side of a first wall element 71, which may have a hole for receiving a cable, may be in sealed engagement with the wall seal 8. On the same inner side of the first wall element 71, the first wall element 71 may additionally be in sealed engagement with an outer seal 3 of the IGU 50. The first wall element 71, which may be a pressure wall clamp plate assembly similar to the clamp plate 9A shown in FIG. 1, may further be inserted within and/or partially enclosed by a second wall element 72. In some embodiments, the second wall element 72 may be a pressure wall trim cap similar to the trim cap 9B shown in FIG. 1. When a frame system is connected in the manner shown in FIG. 2B, a combination of a portion of the frame 1 and its protruding member 9, the wall seal 8, the first wall element 71, the inner and outer glass lites 12, 13 of the IGU 50, and/or the inner and outer seals 2 and 3 may form a sealed glazing pocket. The connectivity module 11 may be connected to a connector attached by a cable or plug-in socket (not shown) of the IGU 50 within the glazing pocket. The connectivity module 11 also may be connected to other electrical devices outside of the glazing pocket through the conduit cable 20 on one end and a panel connector 40 as in FIG. 1 or compression panel connector 135 as in FIG. 2 on the other end, as well various other types of wired connections known to those of skill in the art as discussed further herein. In some embodiments, the conduit cable 20 of the connectivity harness 10 may be a flexible or "flex" printed circuit in the form of a ribbon. In such embodiments, the conduit cable 20 may include substrates which may be formed of adhesive based polyester (PET), PEN or polyimide (PI) films as well other adhesively or non-adhesively bonded dielectric materials. In some embodiments, flex printed circuits may be further composed of a conductive material such as copper or other conductive materials. Additionally, in some embodiments, the conduit cable 20 may have a decorative, e.g., rippled, and/or ultraviolet (UV) protective layer surrounding the various bonded layers. As in the example of FIGS. 2A-2C and other figures described further herein, the flex printed circuit may be substantially flat. Such flexible printed circuits may be composed of flexible, semi-flexible, and even rigid areas or any combination thereof as required for sealing the frame system, such that they may provide strength to the circuit and reduce the effort required to install such circuits within a frame system.

In some embodiments, the conduit cable 20 of the connectivity harness 10 may be connected to a controller module 80 housing an electronic controller. In some embodiments, the controller may be located within an on-frame controller module 180 as shown in FIG. 2C. As further shown in FIGS. 2A-2C, in some embodiments, the connectivity module 11 of the connectivity harness 10 may be electrically connected to an electrical panel through a cable attached to a panel connector 40. In some embodiments, the electrical panel may be an electrical panel 70, having a plug 75 extending therefrom for attachment to the panel connector 40. In some instances, the electrical panel 70 may be a PV panel or an electronics module. The connection between the plug 75 and the panel connector 40 may be a clip-type connection, an interface fit between the panel connector 40 and the plug 75, or by other connectors known to those of skill in the art. In other embodiments, as shown in FIG. 2B, the connectivity harness 10 may be electrically connected to an electrical panel 170, such as a PV panel, through a compression panel connector 135. In such embodiments, the compression panel connector 135 may be inserted, through a threaded interface or an interference fit, to a mounting element 136 within the second wall element 72 to which the electrical panel 170 is attached. The electrical panel 170 may have contacts 138 extending toward the second wall element 72 at the location of the compression panel connector 135. In this manner, the electrical panel 170 may rest against the second wall element 72 such that the contacts 138 of the electrical panel 170 are compressed against corresponding contacts on the compression panel connector 135, electrically connecting the connectivity module 11 with the electrical panel 170.

In some embodiments, a gasket 137 may be placed within a recess of the electrical panel 170 and around a perimeter of the mounting element 136. The gasket 137 may provide a resistance to corrosion or shorting of the electrical circuit between the corresponding contacts of the compression panel connector 135 and the electrical panel 170.

Referring now to FIG. 3, in other embodiments, a connectivity harness 110 may have a connectivity module 111 placed against an insulator 57 of an IGU 50. The connectivity harness 110 may further have a flex printed circuit 120 draped around an edge of the glass lite of the IGU 50 and angled to lie along the glass lite. In some embodiments, as shown in FIG. 3, the connectivity harness 110 may be coated such that the connectivity module 111 and the flex printed circuit 120 form a continuous, single structure. In some embodiments, the combination of the connectivity module 111 and the flex printed circuit 120 may form a single flat laminate along a substantial portion of this combination.

In some embodiments, a multipoint connector 22 may be connected on an end of the flexible printed circuit 120, extending away from the connectivity module 111. The connector shown in FIG. 3 is a pin-type out connector which may be used to interface with a controller, such as the controller module 80 shown in FIG. 2A. As shown in FIG. 3, in some embodiments, the connectivity module 111 may be attached to a connectivity interface 176 that may be used to split electrical signals transmitted to and from the connectivity module 111. In this manner, as further shown in FIG. 3, the connectivity module 111 may be connected to an IGU plug 59 through an IGU connector 160 on an end of a cable extending from the connectivity interface 176. The connectivity module 111 may also be connected to the plug 75 of an electrical panel through a panel connector 140 on an end of another cable extending from the connectivity interface 176. It is to be appreciated that the low profile of the connectivity harness 110 allows the harness to be placed at locations around the perimeter of the IGU 50. Also, the IGU plug 59 may optionally have a microcontroller chip contained therein that may store certain properties related to the IGU 50, as detailed in U.S. Prov. Appl. No. 61/477,245, the entire disclosure of which is hereby incorporated by reference herein.

Figure 4A:
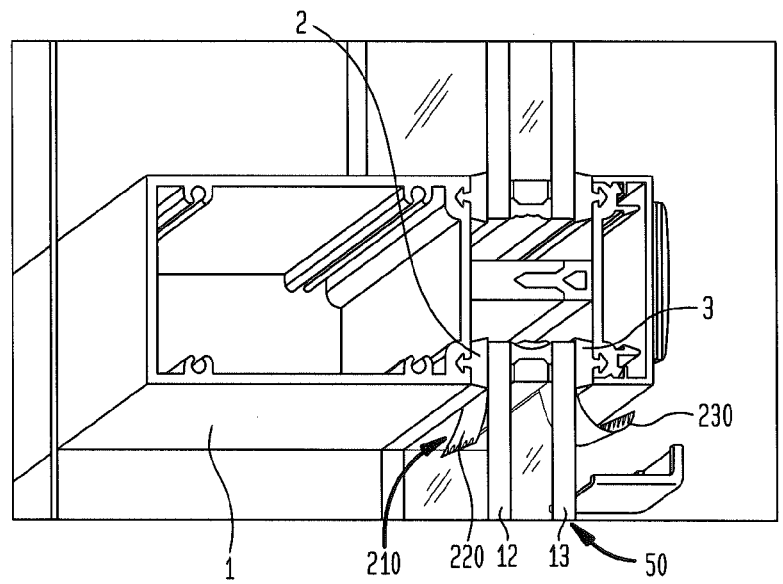
FIG. 4A is a perspective view of a system for providing an electrical interface across a sealed boundary of an architectural glazing frame system in accordance with an embodiment of the invention.
Figure 4B:
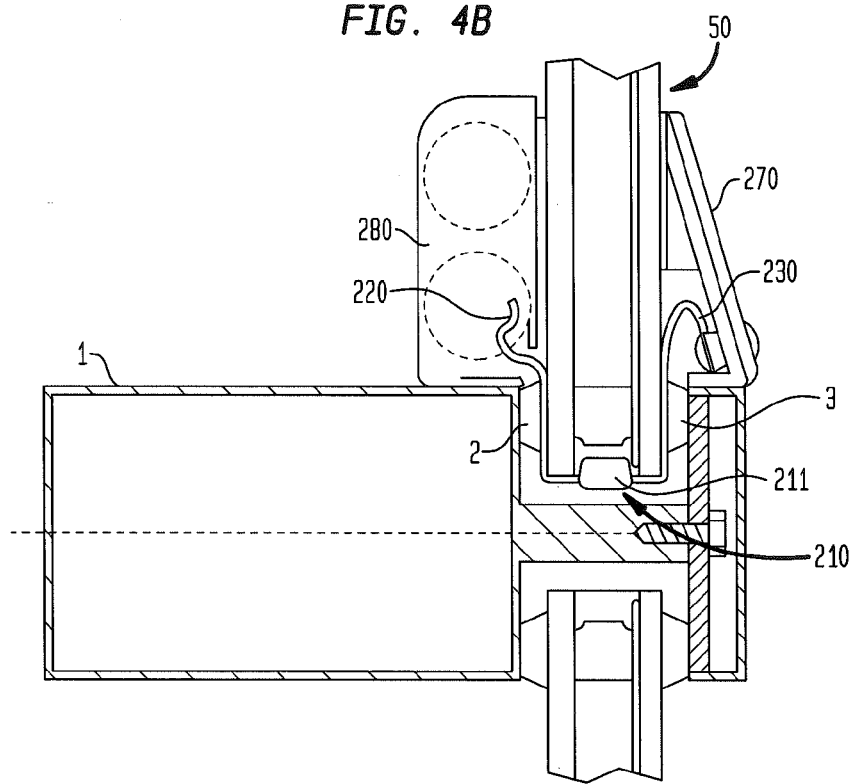
FIG. 4B is a cross-sectional side view of a system for providing an electrical interface across a sealed boundary of an architectural glazing frame system in accordance with an embodiment of the invention having an on-frame controller module and electrical panel.
Figure 4C:
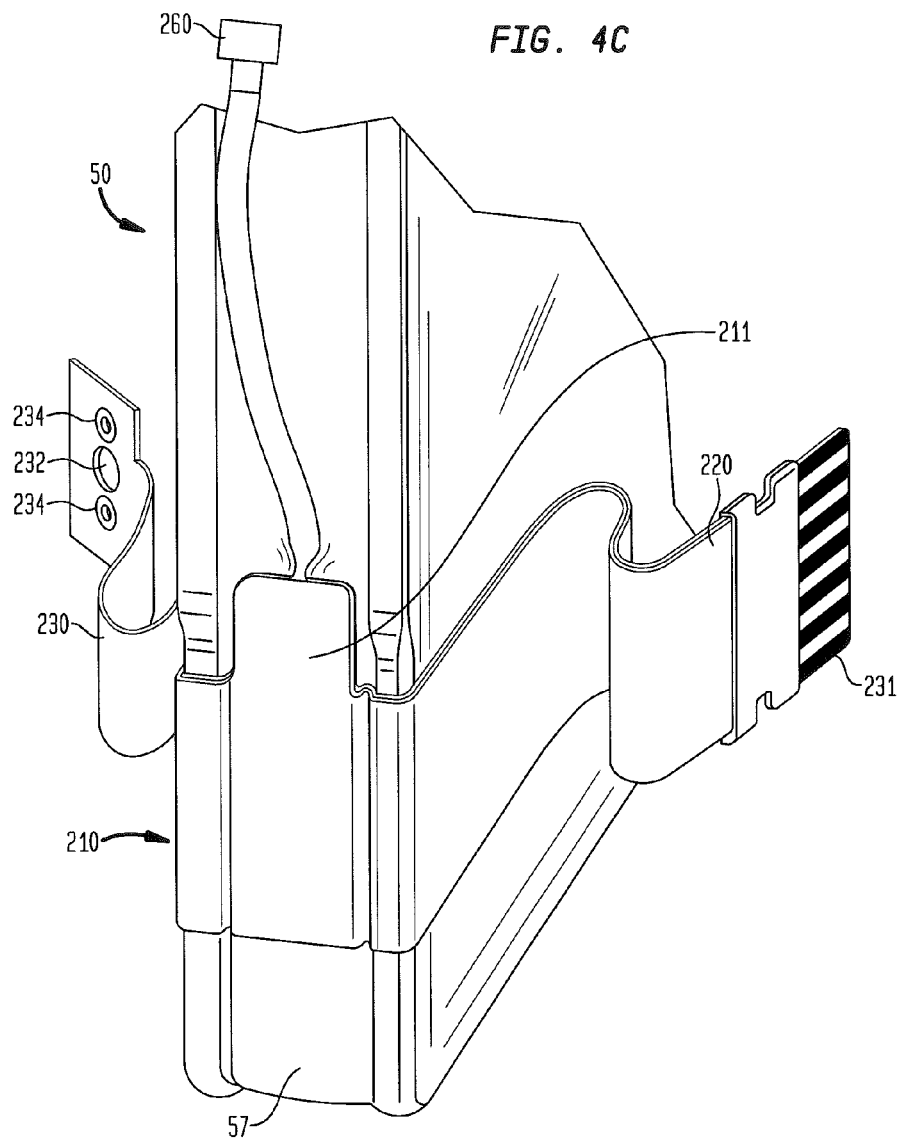
FIG. 4C is a detailed perspective view of a connectivity harness engaged with an insulated glass unit of the system of FIG. 4B.

In other embodiments, such as those exemplified in FIGS. 4A-4C, a connectivity harness 210 may be connected to the IGU 50 on an upper portion thereof within a glazing pocket (See, e.g., FIGS. 2B and 2C.). The connectivity harness 210 may have an inner printed circuit 220 that extends between the inner glass lite 12 and the inner seal 2 from a first portion of a connectivity module 211. The harness 210 may additionally have an outer printed circuit 230 extending from a second portion of the connectivity module 211 and extending between the outer glass lite 13 and the outer seal 3. As shown in FIGS. 4A-4C, the inner and outer printed circuit ribbons may be in the form of substantially flat ribbons. As shown in FIG. 4B, in some embodiments, the connectivity harness 210 may be used to connect a controller that may be within an on-frame controller module 280 on an interior of a building to an electrical panel 270, such as a PV panel, on an exterior of a building. In some embodiments, it is believed that the use of two flexible circuit ribbons in the connectivity harness 210 may reduce or eliminate the need to drill holes through the frame elements to connect the IGU to electronic interfaces on the interior and exterior of buildings utilizing architectural glazing systems.

As shown in the detailed view of FIG. 4C, the connectivity harness 210 may connect to the IGU 50 through an IGU connector 260 extending from the connectivity module 211. In some embodiments, the IGU connector 260 may extend from a cable attached to the connectivity module 211 in a direction substantially along the insulator 57 between the two glass lites of the IGU 50. The insulator 57 may be recessed below end surfaces of each of the two glass lites. When the insulator 57 is recessed in this manner, the IGU connector 260 and the cable connecting it to the connectivity module 211 may extend along the insulator 57 between each of the two glass lites without contacting the frame into which the IGU is installed. Either or both of the flex printed circuits 220 and 230 may extend from the portion of the connectivity harness 210 housing the connectivity module 211 by wrapping around the end surfaces of the corresponding glass lites and then by extending along the corresponding glass lites. In wrapping around each of the glass lites, either or both of the flex printed circuits 220 and 230, in some embodiments, may be flush against these edges. In some embodiments, the edges of each of the glass lites may be radiused to improve the engagement between the flex printed circuits and the glass surfaces as a weather-tight seal is preferred.

As further shown in FIG. 4C, the inner flex printed circuit 220 may have a multicircuit connector 231 on an end thereof. In some embodiments, multicircuit 231 may be a ZIF-type connector, such as those used to connect to a multicircuit control module. As shown in the example of FIG. 4C, the outer flex printed circuit 230 may employ a contact 232 on an end of the flex printed circuit 230 for contacting and electrically communicating with a terminal of an electrical panel such as a PV panel. In this example, the ends of the outer printed circuit 230 may be affixed to the electrical panel by fasteners inserted into the holes 234 shown in FIG. 4C.

Figure 5:
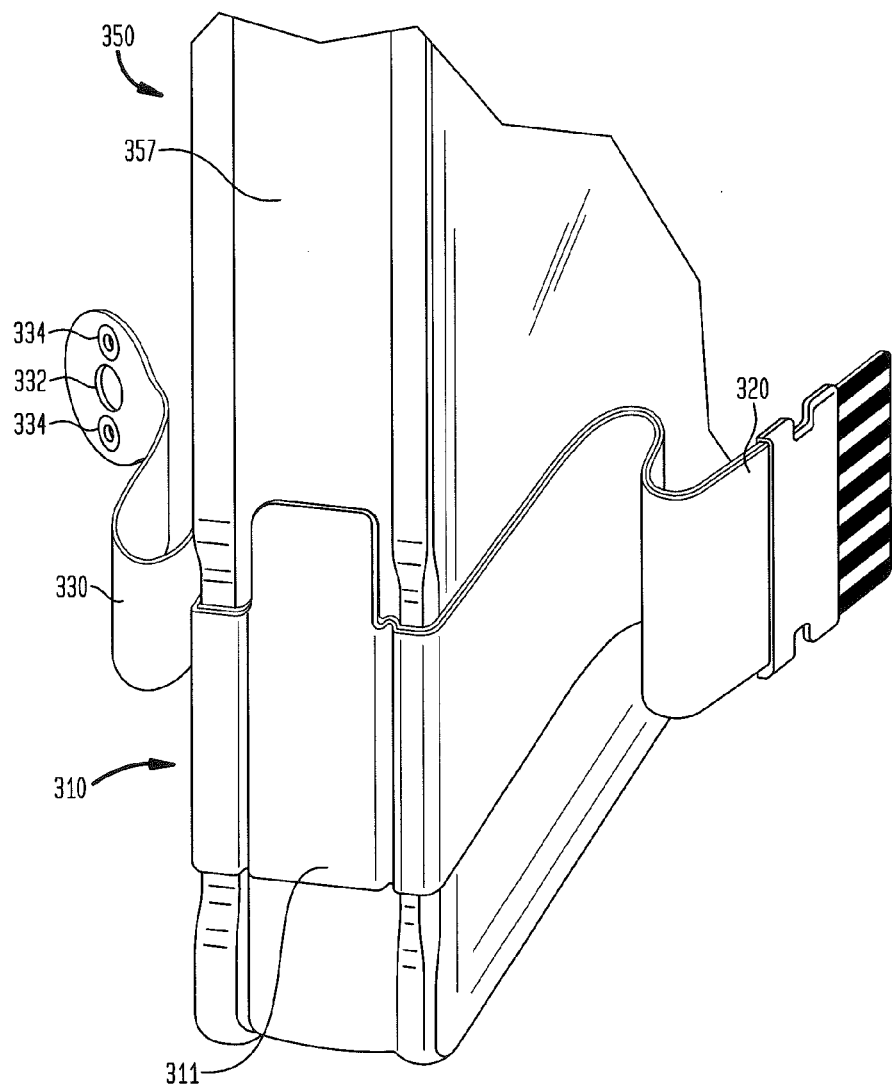
FIG. 5 is a detailed perspective view of a connectivity harness engaged with an insulated glass unit for use in an architectural glazing frame system in accordance with an embodiment of the invention.

In a variation of the connectivity harness 210, as shown in the example of FIG. 5, a connectivity harness 310 may be connected to an IGU 350 without the use of cables. In some embodiments employing this configuration, a connectivity module 311 may have pin-type terminals for insertion into socket-type terminals, at a position along the perimeter of the IGU 350. These types of terminals are well known to those of ordinary skill in the art. In preferred embodiments, an insulator 357 may be placed inwardly of end surfaces of inner and outer glass lites toward the center of the IGU 350 to form a recessed region in the IGU 350. In this manner, the IGU 350 may accommodate placement of the connectivity module 311 within this recessed region such that the module 311 sits below the end surfaces of the two glass lites.

Various configurations of the flex circuit designs are possible to achieve the interior and exterior connections described herein with respect to each of FIGS. 2A-5. In some embodiments, the flex printed circuits may be flat ribbons having a consistent thickness across a width of the ribbon which may range from about 0.008 inches to about 0.015 inches.

As shown in FIG. 6A, and in accordance with some embodiments, a flex printed circuit ribbon 410A may be formed of three distinct layers 415A, 415B, and 415C in which each layer may have a uniform thickness across an entire width of the layers. In this manner, the ribbon 410A may have a uniform total thickness by stacking and bonding the top layer 415A onto an intermediate layer 415B which is then stacked and bonded onto a bottom layer 415C. As further shown in FIG. 7, when the three layers 415A, 415B, and 415C are stacked together, they have a substantially consistent width such that they form a flat edge 414.

As further shown in FIG. 6A, at locations across the width of the flex printed circuit ribbon 410A may be conductors, such as copper traces, running through a series of layers 415A-C. When the printed circuit ribbon 410A is placed on an edge of a glass lite substrate 412 for use in an architectural glazing frame system, the flat-edge design may seal along a majority of an interface between the ribbon 410A and the glass lite substrate 412. However, such a design may leave a gap along a portion of the flat edge when the printed circuit ribbon 410A is inserted between a seal 402 and a glass lite substrate 412 due to limitations on the elasticity of the seal 402. It is believed that these limitations prevent the seal 402 from fully conforming to the surface of the printed circuit ribbon 410A. To fully seal across the interface between the connectivity harness and the glass lite substrate, an additional sealing mechanism, such as a bead of silicone caulk, may need to be applied to the gap.

In accordance with other embodiments, a flex printed circuit ribbon 410B may be formed by bonding a top layer 416A onto an intermediate layer 416B such that an edge of the top layer 416A is set inwardly from the edge of the intermediate layer 416B relative to limits of the width of the flex printed circuit ribbon 410B. Similarly, the intermediate layer 416B may be bonded onto a bottom layer 416C such that the edge of the intermediate layer 416B is set inwardly from an edge of the bottom layer 416C relative to the width of the ribbon 410B. In this manner, when the ribbon 410B is inserted within a sealed region of an architectural glazing frame system, such as in the region between the seal 402 and the glass lite substrate 412, it is believed that a series of small gaps may be formed at the interfaces between the seal 402 and each of the edges of the layers 416A-C. Such gaps are primarily due to the limits on the elasticity on the seal 402. However, it is believed that the gaps formed between each layer and the contacting seal in such a configuration would be smaller than the gaps formed between the layers and seal in the configuration in which the layers have aligned edges, such as when using the connectivity harness 410A. In a variation of the example of FIG. 6B, a layer or layers similar to layers 416A-C of a flex printed circuit ribbon 410C may have a tapered edge 417 that tapers from a surface of the ribbon 410C opposite a surface of the ribbon 410C that contacts the glass lite substrate 412 toward a tip 418. It is believed that the use of such a taper may reduce or eliminate the formation of a step and thus reduce or eliminate gaps between the glass lite substrate and the flex printed circuit ribbon. When forming a tapered edge with multiple layers, the taper may be formed simultaneously across the multiple layers, such as through a cutting operation, after bonding the multiple layers together to aid in reducing or eliminating steps being formed by offsetting edges of the respective layers.

Figure 7A:
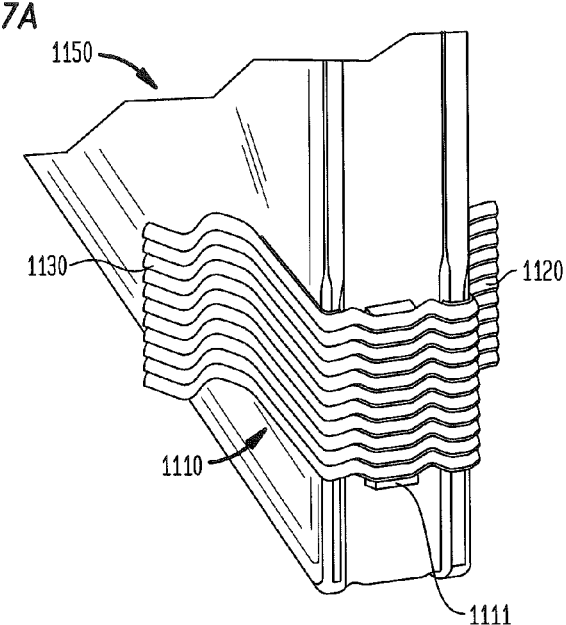
FIG. 7A is a detailed perspective view of a connectivity harness engaged with an insulated glass unit for use in an architectural glazing frame system in accordance with an embodiment of the invention.

As shown in FIG. 7A, in some embodiments, conduit cables of a connectivity harness 1110 may be inner and outer flexible ribbon cables 1120, 1130. Such flexible ribbon cables may have a jacket surrounding and conforming to the rounded shape of wires, which may be made of copper or other electrically conductive materials, running along the connectivity harness. As the jacket conforms to the shape of the wires running through the connectivity harness 1110, it is believed that indentations or ripples may be formed on the surface of the connectivity harness 1110. The jacket may be made from a low durometer elastomer such as, but not limited to, rubber, silicone, or polyurethane, that allows compression against the surface of the connectivity harness 1110 to mold the jacket to the surface against which it is compressed. This allows the connectivity harness 1110 to form a tight seal between a first side of the inner and outer flex circuit ribbons 1120, 1130, and an IGU 1150 to which the connectivity harness 1110 may be connected. The compressibility of the inner and outer flex ribbon cables 1120, 1130 may also allow the connectivity harness 1110 to form a tight seal between inner and outer seals in mating engagement with the respective ribbons and the IGU 1150.

Figure 7B:
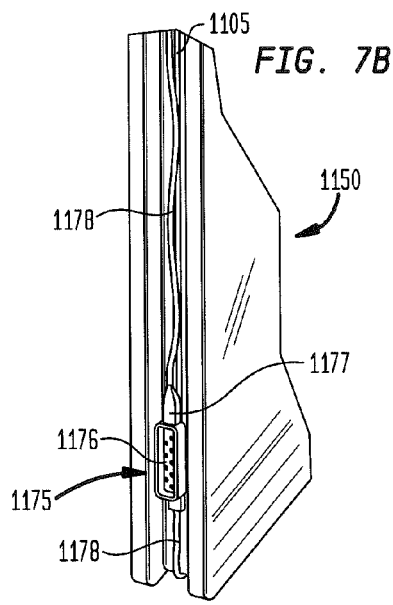
FIG. 7B is a perspective view of a configuration of the insulated glass unit of FIG. 7A prior to the addition of a secondary seal fill.

As illustrated in FIG. 7B, an IGU wire harness connector 1175 may extend from the IGU 1150. In some embodiments, sockets 1176 provided within the connector 1175 may receive terminals extending from a connectivity module, such as the connectivity module 1111 of the connectivity harness 1110 or a connectivity module 1211 of a connectivity harness 1210. The connectivity modules 1111 and 1211 may be inserted similarly into the connector 1175 of the IGU 1150. However, as shown in FIG. 7B, the inner and outer flex ribbons 1120 and 1130 of the connectivity harness 1110 may be integrated such that when connectivity harness 1110 is inserted into the IGU 1150, the jacket thereof covers at least a majority of the connectivity module 1111.

Figure 7C:
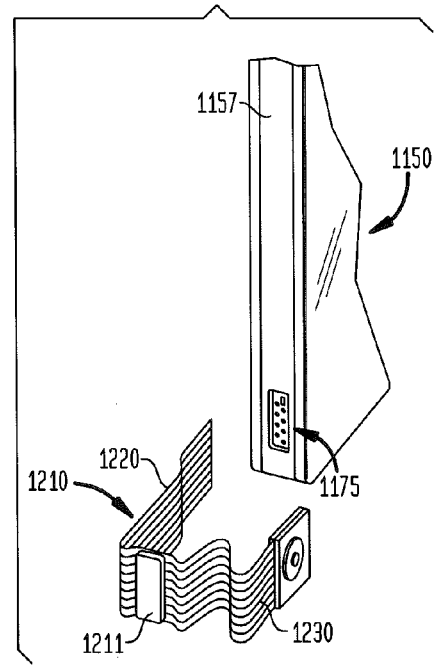
FIG. 7C is a perspective view of the insulated glass unit of FIG. 7B prior to insertion of an alternative configuration of the connectivity harness of FIG. 7A.

As shown in FIG. 7C, inner and outer flex ribbons 1220 extend from the connectivity module 1211 but, in contrast to the connectivity harness 1110, do not share the same jacket. In this manner, a surface of the connectivity module 1211 remains exposed upon insertion of the module 1211 into the IGU wire harness connector 1275 of the IGU 1150.

Referring again to FIG. 7B, connectors 1177 may be on opposing ends of the IGU wire harness 1175 and may be attached to wires 1178 running along spacer 1105. In this manner, the wires 1178 may be used to electrically connect the IGU wire harness 1175 to the IGU 1150 at a different location than the location of the physical interface of a connectivity harness, such as connectivity harnesses 1110 and 1210, in the sockets 1176 of the IGU wire harness connector 1175. As shown in FIG. 7C, in some embodiments, an insulator 1157 may encapsulate the wires 1178 and portions of the IGU wire harness connector 1175.

Figure 8A:
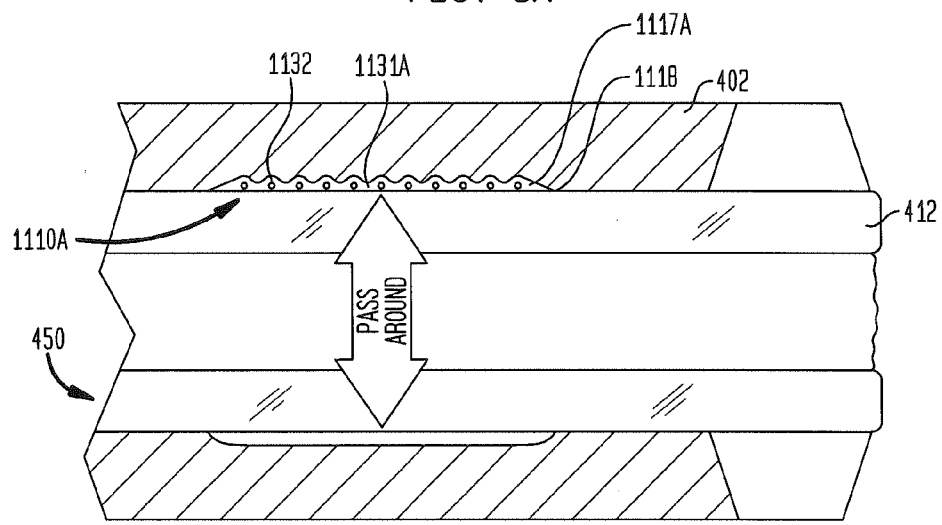
FIG. 8A is a cross-sectional side view of a portion of the architectural glazing frame system of FIG. 7A.
Figure 8B:
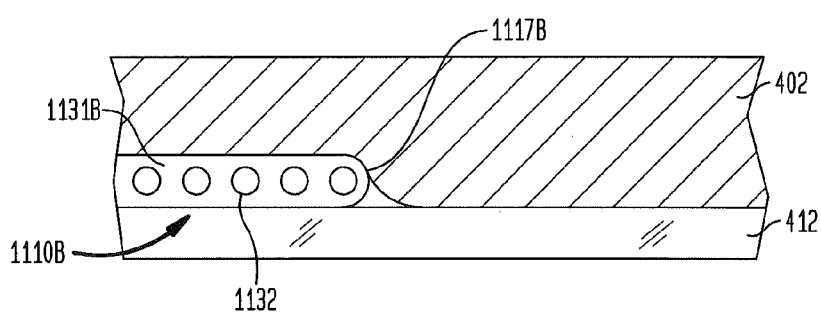
FIG. 8B is a cross-sectional side view of a portion of an architectural glazing frame system in accordance with an embodiment of the invention.
Figure 8C:
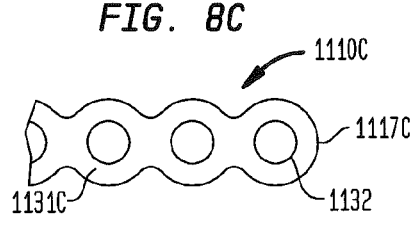
FIG. 8C is a cross-sectional side view of a portion of an architectural glazing frame system in accordance with an embodiment of the invention.
Figure 8D:
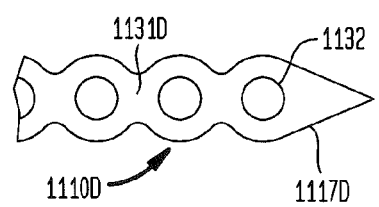
FIG. 8D is a cross-sectional side view of a portion of an architectural glazing frame system in accordance with an embodiment of the invention.

As illustrated in FIGS. 8A-8D, a number of configurations of flexible ribbon cables may be used in conjunction with IGUs. In some embodiments, as in FIG. 8A, a connectivity harness 1110A may have a dielectric sheath 1131A forming a jacket over parallel or at least substantially parallel wires 1132 extending through a length of the sheath and having a tapered edge 1117 that tapers in a direction away from a center of the sheath 1131A from a surface of the sheath opposite a surface thereof contacting a glass substrate 412 to a tip 418 at an extreme boundary. In other configurations of flexible ribbon cables, as shown in FIGS. 8B and 8C, connectivity harnesses 1110B and 1110C may have respective dielectric sheaths 1131B and 1131C with respective rounded edges 1117B and 1117C. In still other configurations, as shown in FIG. 8D, a connectivity harness 1110D may have a dielectric sheath 1131D with a dual tapered edge 1117D that tapers from opposing surfaces of the sheath 1131D. It is believed that among these configurations, the tapered edge 1117A may provide the smallest gaps between interfaces of the connectivity harness, the glass lite, and the seal covering the harness and glass lite. However, additional configurations of edges may be utilized in conjunction with connectivity harnesses.

In some embodiments, such as shown in FIGS. 8A, 8C, and 8D, the connectivity harness 1110A, 1110B, 1110D, may have a dielectric sheath that forms ripples or waves over wires running through the sheath. It is to be appreciated that when the connectivity harness 410C is placed between the seal 402 and the glass lite substrate 412, the gradual slopes of any ripples and of the tapered edge 417 across the width of the connectivity harness 410C may allow the elastic seal 402 to expand and fill the gaps along the surface of the connectivity harness 410C. In other embodiments, such as shown in FIG. 8B, the connectivity harness 1110C may have a substantially flat profile across its width. It is believed that such a profile may allow the connectivity harness 410C to have few if any gaps at the interface between the connectivity harness 410C and the seal 402, reducing the need for additional sealants, such as caulk, relative to similar interfaces having either or both of a greater number of gaps and larger gaps. Such flexible ribbon cables may have a thickness ranging from about 0.035 to about 0.040 inches across a width thereof.

Referring to FIGS. 8A and 8B, in some embodiments, the seal 402 may be a compression seal. In such configurations, the installation of the IGU may cause a compression loading between the flexible ribbon cable of a connectivity harness such as the connectivity harnesses 1110A-D. When seal 402 is a compression seal, the seal may distort to match the form of the ribbon cable to create a seal. It is believed that when the ribbon cable has a sufficiently low profile across its width, additional sealants, such as silicone caulk, may not be required to create a sufficient seal. However, such sealants may be utilized with configurations having a compression seal where required.

Figure 9A:
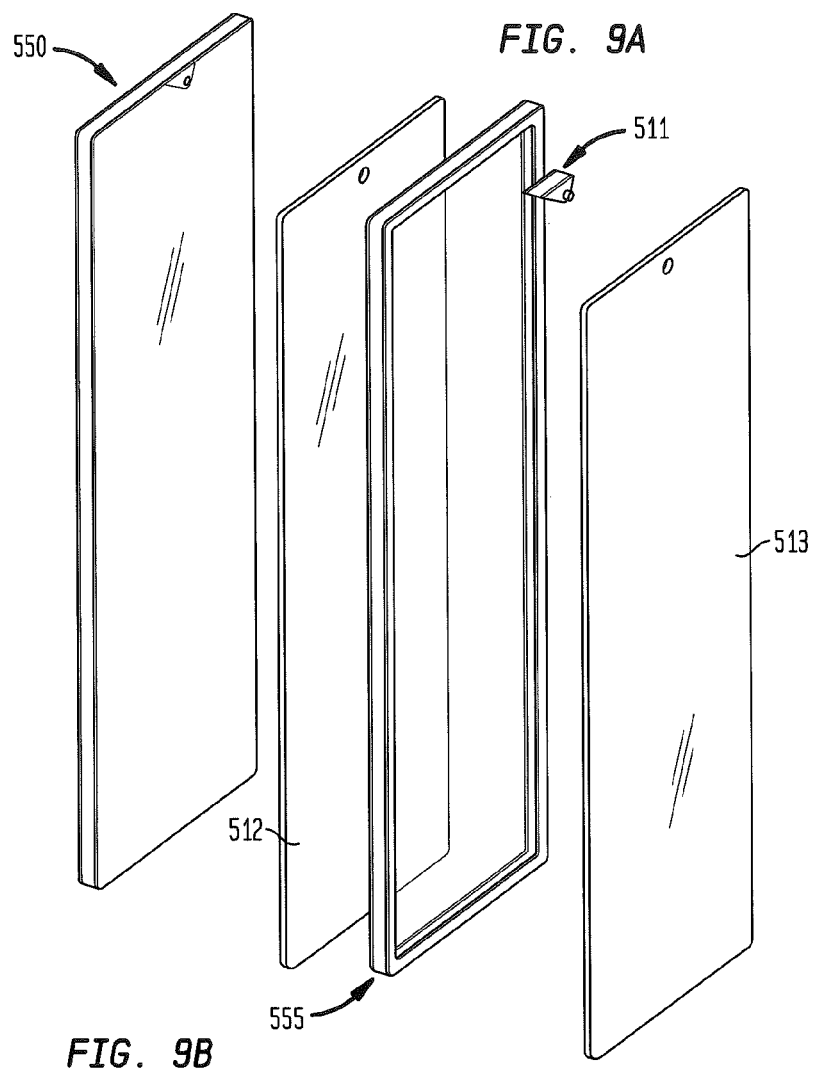
FIG. 9A shows exploded and perspective views of an insulated glass unit having a connectivity module connected thereto in accordance with an embodiment of the invention.
Figure 9B:
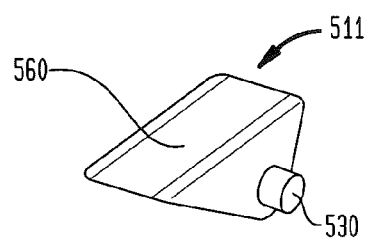
FIG. 9B is a perspective view of the connectivity module of FIG. 9A.

Referring to FIG. 9A, a connectivity module 511 may be inserted within a hoop of a spacer 555 of an IGU 550. As shown in FIG. 9B, the connectivity module 511 may have a panel connector 560 for attachment to the inner portion of and in electrical engagement with the spacer 555. The connectivity module 511 may have an inner connector (not shown) 520 and an outer connector 530 for attachment to electrical components on each side of the spacer 555. In some embodiments, the inner and outer connectors may be in electrical communication with each other, the panel connector 560, or any combination of these.

As further shown in FIGS. 9A and 9B, holes may be formed, for instance by drilling, within an inner glass lite 512 and an outer glass lite 513 of an IGU 550. The holes of the glass lites 512, 513 may be placed around the inner and outer connectors 520, 530 to enable the electrical components to be inserted therein and to connect to the inner and outer connectors 520, 530. In this manner, components on the exterior of a building can be electrically connected to components on the interior of a building while still using conventional building seals.

As shown in FIG. 10, a spacer 655 of an IGU 650 is modified to have an inward bend 656 at a portion of the spacer 655 to accommodate a connectivity module 611 at the point of the inward bend 656. When the connectivity module is placed into the inward bend 656 of the spacer 655, an outer portion 657 of the spacer 655 may be flush with a face of the connectivity module 611. As further shown in FIG. 10, holes may be formed within an inner glass lite 612 and an outer glass lite 613 of the IGU 650. In some embodiments, the holes may be placed around an inner connector 620 (not shown) and an outer connector 630. In the example of FIG. 10, the inner and outer connectors 620, 630 may be connected to electrical components that may be inserted therein as shown in FIG. 10, or thereabout as in other embodiments not shown. In the example shown in FIG. 10, the IGU 650 may be placed into an architectural glazing frame system with inner and outer seals placed along a top portion of the IGU 650 and between the IGU 650 and portions of a frame system. In such a configuration in which the connectivity module 611 is placed along a horizontal portion of the IGU 650, the inner and outer connectors 620, 630 of the connectivity module 611 may be accessible through holes within the inner and outer seals. In other configurations in which the connectivity module 611 is placed along vertical portions, inner and outer connectors 620, 630 may be accessible outside of a frame which may allow for connection to a controller or control module placed on an exterior of a frame.

Figure 11:
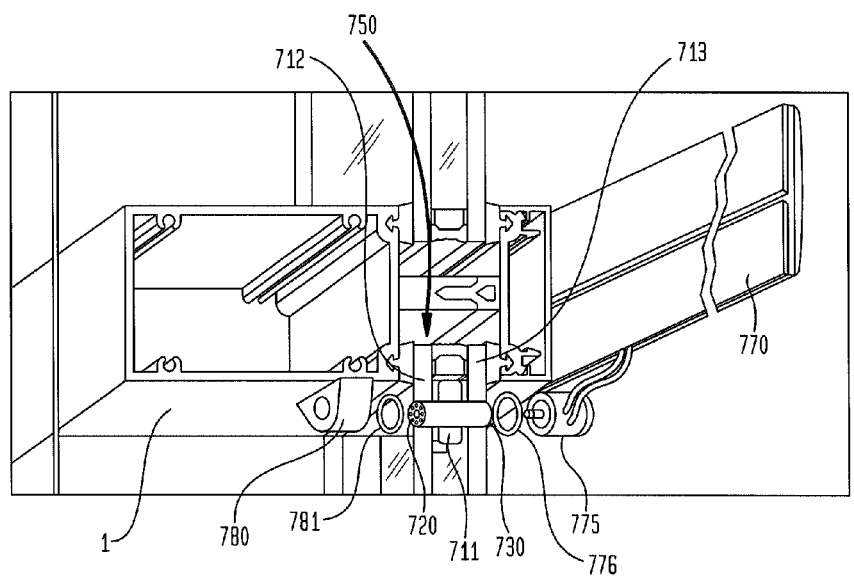
FIG. 11 is a partially perspective and partially exploded view of a system for providing an electrical interface across a sealed boundary of an architectural glazing frame system in accordance with an embodiment of the invention.

FIG. 11 illustrates another variation of a connectivity module placed outside of a hoop of a spacer. In this example, a connectivity module 711 is placed on an outer vertical portion of an IGU 750. In some embodiments, as is shown in FIG. 11, a portion of the connectivity module 711 may extend through an indentations along a side of the IGU 750 including indentations within glass lites 712, 713 in order to reduce the extent that the connectivity module protrudes from the IGU 750 and interferes with the proper sealing thereof. Due to the location of the connectivity module 711 around the IGU 750, inner and outer connectors 720, 730 of the connectivity module 711 extend beyond the respective inner and outer glass lites 712, 713 of the IGU 750 below the respective building frame and opposing wall elements. In this manner, the inner connector 720 may be connected to a controller plug 780 attached to the exterior of the frame, and the outer connector 730 may be connected to a panel plug 775 attached along a bottom portion of an electrical panel 770. The electrical panel 770 may be a PV panel or an electronics module on the exterior of a building. As further shown in FIG. 11, in some embodiments, the controller plug 780 and the panel plug 775 may have male pins for connection to female terminals on the inner and outer connectors 720, 730. Any number of pins may be used depending on the desired application for the electrical connections. In some embodiments, either or both of the inner and outer connectors may provide male connections, and the controller and panel plugs may provide female connections. As further shown in FIG. 11, a controller plug seal 781 may be placed at the interface between the controller plug 780 and the inner connector 720. Additionally, a panel plug seal 776 may be placed at the interface between the panel plug 775 and the outer connector 730.

Figure 12A:
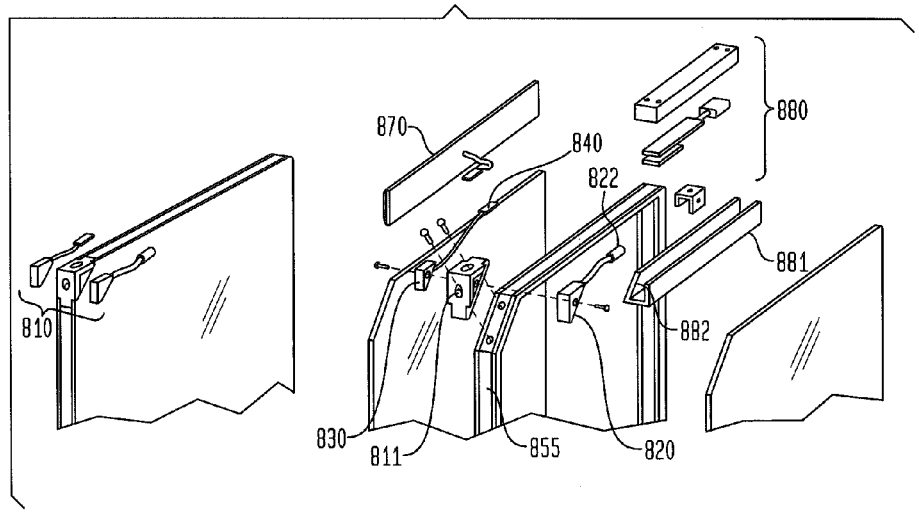
FIG. 12A shows exploded views of a portion of an insulated glass unit with a connectivity module connected thereto in accordance with an embodiment of the invention.
Figure 12B:
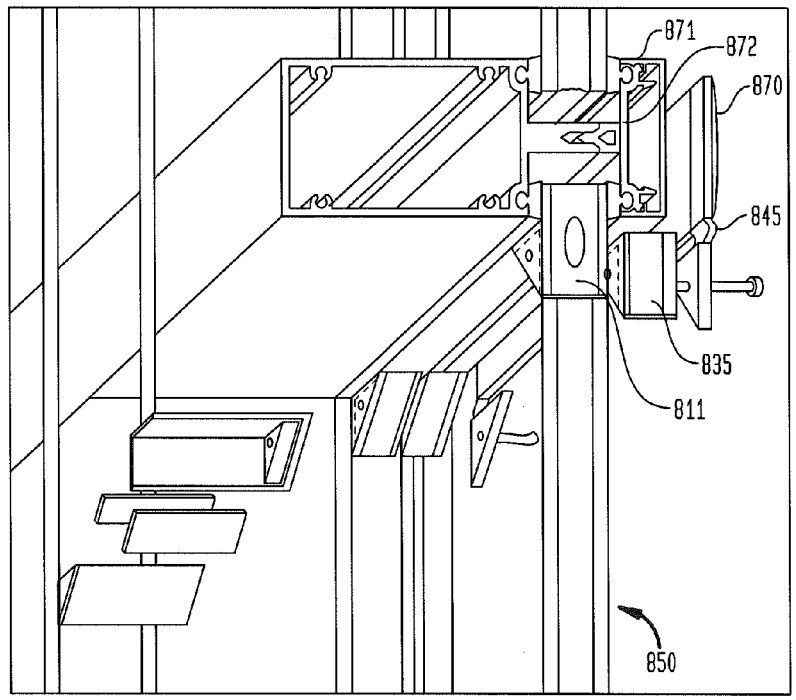
FIG. 12B is a partially perspective and partially exploded view of a system for providing an electrical interface across a sealed boundary of an architectural glazing frame system in accordance with an embodiment of the invention.

FIGS. 12A and 12B show exemplify another embodiment of a connectivity module placed on an outer portion of an IGU. In this example, a connectivity module 811 may be attached to an outer portion of a spacer 855 of an IGU 850 such that the connectivity module forms the corner of the IGU 850. The connectivity module 811 may be attached to the spacer 855 through any type of fastener or adhesive or by other connection processes. As shown in FIG. 12A, a controller plug 820 and a panel plug 830 may be inserted on opposite sides of the connectivity module 811 to form a connectivity assembly 810. A controller connector 822 may extend from one end of a cable that extends on an opposite end thereof from the controller plug 820. As shown in FIG. 12A, the controller connector 822 may be connected to a controller module 880. In some embodiments, the controller module 880 and the controller connector 822 may be placed within a trim cover 881 for housing the controller module 880 when IGU 850 is placed in an architectural glazing frame system. In some embodiments, there may be a notch 882 formed at a portion of the trim cover 881 adjacent to the controller plug 820 to allow at least a portion of the controller plug 820 to be inserted into the trim cover 881. In other embodiments, extending from a cable attached to the panel plug 830 may be a panel connector 840 for connecting to a respective electrical panel 870, such as a PV panel.

In a variation of the embodiment of FIG. 12A, attached to one side of the connectivity module 811 may be an interface block 835 as shown in FIG. 12B. The interface block 835 may have a thickness allowing it to extend beyond first and second wall elements 871 and 872 of a framing system. As further shown in FIG. 12B a panel connector 845 may be attached to the interface block 835 and the electrical panel 870 and provide an electrical interface between these components. Through the use of the interface block 835, the physical connection between the electrical panel 870 and the connectivity module 811 uses a smaller length of flexible cable and provides more rigidity to this connection.

In variations of the embodiments of FIGS. 9A-12B, a hole or a plurality of holes may pass through the connectivity module at the positions of the inner and outer connectors to allow wires or cables to pass therethrough. In such a configuration, the components on the exterior of a building may be directly connected to the components on the interior of the building.

Figure 13:
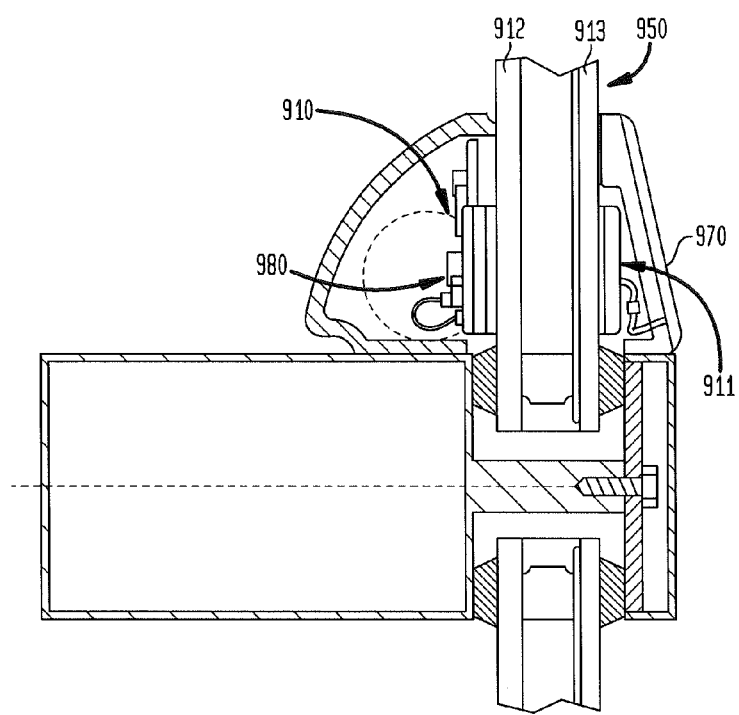
FIG. 13 is a cross-sectional side view of a system for providing an electrical interface across a sealed boundary of an architectural glazing frame system in accordance with an embodiment of the invention.

In other embodiments as shown in the examples of FIGS. 13 and 14, electrical interfaces may be made across an IGU without the use of cable, wires, or other conductors crossing the planes through the inner and outer glass lites of the IGU. In FIG. 13, a controller module 910 in communication with a controller 980 may transmit and receive electrical signals to and from a panel module 911 in communication with an electrical panel 970. Significantly, such signals may be transmitted wirelessly through both the inner and outer glass lites 912, 913 of an IGU 950. In some embodiments, the controller module 910 may be affixed to an inner glass lite 912 of the IGU 950 and the panel module 911 may be similarly affixed to an outer glass lite 913 at a position nearest to the controller module 910 to reduce the spacing between the modules. It is believed that this reduced spacing will improve the signal strength received by each module from the corresponding module. Such wireless systems are further described in U.S. patent application Ser. No. 13/354,863 and U.S. Pat. No. 6,055,089, the entire disclosures of which are hereby incorporated by reference herein.

In some embodiments, the controller 980 may have a wired connection to a controller module 910 near the controller, such as in the example of FIG. 13, while in other embodiments the controller may have an additional wireless connection to the controller module. An additional wireless connection to the controller module may allow the controller to be placed elsewhere within a frame without having to drill through the frame. Similarly, the panel module may have a wired or wireless connection to the electrical panel.

In the example of FIG. 14, spacing between a controller module and a panel module is further reduced relative to the spacing of these modules in the example of FIG. 13. As shown, in some embodiments, a controller module 1010 may be affixed to a side of an outer glass lite 1013 at a location opposite a panel module 1011 of an IGU 1050. In this manner, the controller module and the panel module may be separated only by the thickness of the single pane of the glass lite. It is believed that this separation will further increase the signal strength received by each of the modules from the other module. Although the controller module 1010 may be connected wirelessly to an adjacent controller 1080 in some embodiments, as shown in FIG. 14, where a wired connection is desired, a hole may be formed within the inner glass lite 1012 to accommodate the wire from the controller module 1010 to the controller 1080. In preferred embodiments, when a hole is formed within the inner glass lite 1012, a portion of a spacer and insulative material may be used to surround the controller module to provide rigidity to the IGU around the formed hole, to prevent electrical interference by the inserted controller module, and to seal the IGU.

The wireless signals may be generated by a variety of devices and processes known to those of ordinary skill in the art. In some embodiments, magnetic fields may be produced by electrical inductors, which may or may not be resonantly coupled, that pass energy through the glass lites. In some instances, the electrical inductors may be coils printed onto the glass lites which supply a magnetic field when a current is passed through the coils. In other embodiments, controller and panel modules may transfer energy through the glass lites through the use of electromagnetic energy, such as visible or infrared light, which may be in the form of a laser. In still other embodiments, ultrasonic transceivers may pass energy acoustically through the IGU or other portion of the framing system.

Figure 15A:
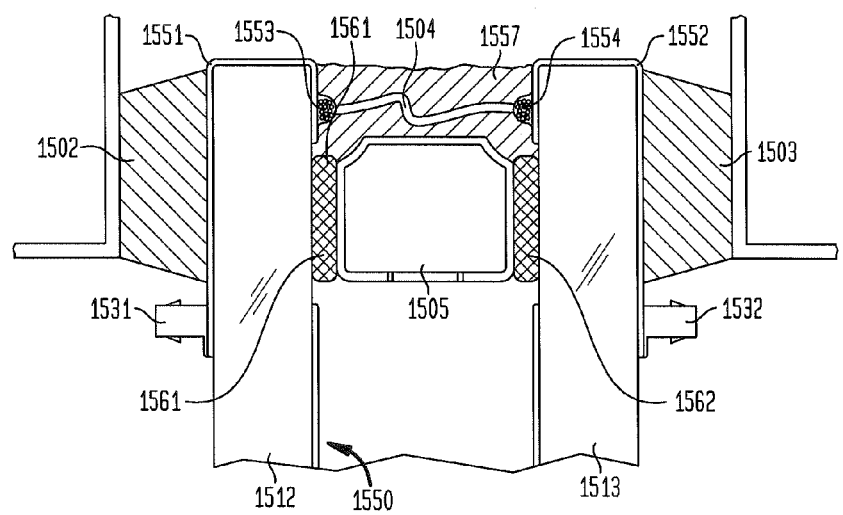
FIG. 15A is a cross-sectional view of a system for providing an electrical interface across a sealed boundary of an architectural glazing frame system in accordance with an embodiment of the invention.
Figure 15B:
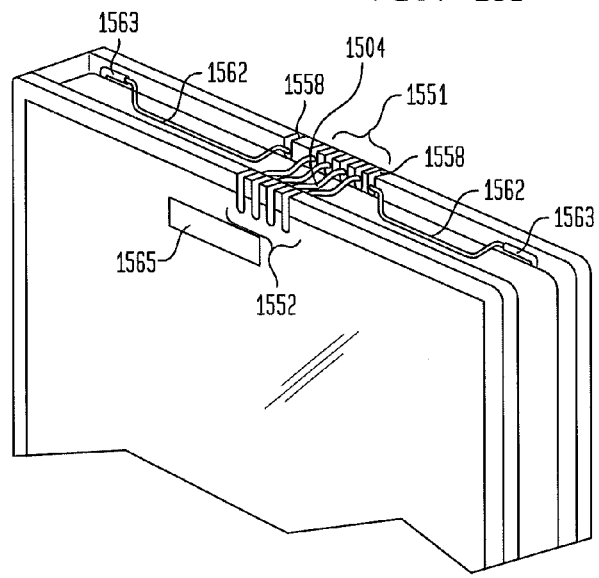
FIG. 15B is a perspective view of a portion of the system of 15A prior to the filling of a secondary seal.

Referring now to FIGS. 15A and 15B, an inner bus layer 1551 and an outer bus layer 1552 may be formed around edges of respective inner glass lite 1512 and outer glass lite 1513 of an IGU 1550 such that opposite ends of the respective bus layers 1551, 1552 lie on opposing surfaces of the glass lites 1512, 1513, i.e., on the inwardly and outwardly facing surfaces of the IGU 1550 that typically face the interior or exterior of a structure or building in which the IGU may be placed. The inner and outer bus layers 1551, 1552 may be fixed to the glass lites through adhesive or non-adhesive bonding or firing. The bus layers 1551, 1552 may be made of electrically conductive materials such as copper, silver, or carbon, and alloys thereof. As best shown in FIG. 15A, in some embodiments, one or both of the inner and outer bus layers may run along the outwardly facing surfaces of the IGU 1550 between an inner seal 1502 and the glass lite 1512 and between an outer seal 1503 and glass lite 1513 when the bus layers are so extended.

One or both of an inner connector 1531 and an outer connector 1532 may extend from and be electrically connected to either or both of the respective inner and outer bus layers 1551, 1552 on respective ends of the bus layers on the outwardly facing surfaces of the IGU 1550. In this manner, the inner and outer connectors 1531, 1532 may serve as electrical conduits to other devices such as PV panels, light sensors, thermal sensors, other IGUs, control modules, and other electrical components on either side of the IGU 1550. One or both of an inner connection tab 1553 and an outer connection tab 1554, which in some embodiments may be solder joints, may extend from respective ends of the bus layers on the inwardly facing surfaces of the glass lites of the IGU 1550. In this manner, the inner and outer connection tabs 1553, 1554 may be connected to opposite ends of a bridging cable 1504 such that the inner and outer bus layers and thus components electrically connected thereto are in electrical communication. In some embodiments an insulator 1557, such as insulators described previously herein, may be applied around the edge of the IGU 1550 to seal the bridging cable 1504. The insulator 1557 may act as a secondary seal to inner and outer spacer seals 1561, 1562, which may be formed of polyisobutylene (PIB) material or other appropriate materials known to those of skill in the art, that may be placed between opposing sides of a spacer 1505 and the glass lites 1512, 1513.

In some embodiments, either or both of the portions of the bus layers on the inwardly facing surfaces of the glass lites may extend along the inwardly facing surfaces such that the bus layers so extending do so between the spacer 1505 and the respective glass lites 1512. 1513. In this manner, either or both of the bus layers may be connected to electronic devices within the sealed region of the IGU 1550 inside the perimeter or hoop of the spacer 1505.

As detailed in FIG. 15B, in some embodiments, prior to the application of the insulator 1557, jumpers 1562 may be extend from and be electrically connected to either or both of the inner and outer bus layers 1551, 1552. Such jumpers 1562 may be wires, collections of wires, ribbon cables, or other electrical conductors. As shown, in some embodiments, the jumpers 1562 may extend from the bus layers 1551, 1552 on one end and connect to one or more connectivity tabs 1563 located at positions on the IGU 1550 around the perimeter. In this manner, in some embodiments, the bus layers 1551, 1552 may be electrically connected to portions of the IGU 1550 such as electrochromic devices thereof known to those of skill in the art. Optionally, a bus layer cover 1565 may be placed over exposed portions of the inner and outer bus layers 1551, 1552, in particular on the portions along the outwardly facing surfaces of the IGU 1550. The bus layer cover 1565 may be a protective dielectric film or a tape, such as but not limited to polyimide tape, polyester tape, or a mylar sheet, for reducing the risk of wear on the bus layers during installation of the IGU.

Figure 1:
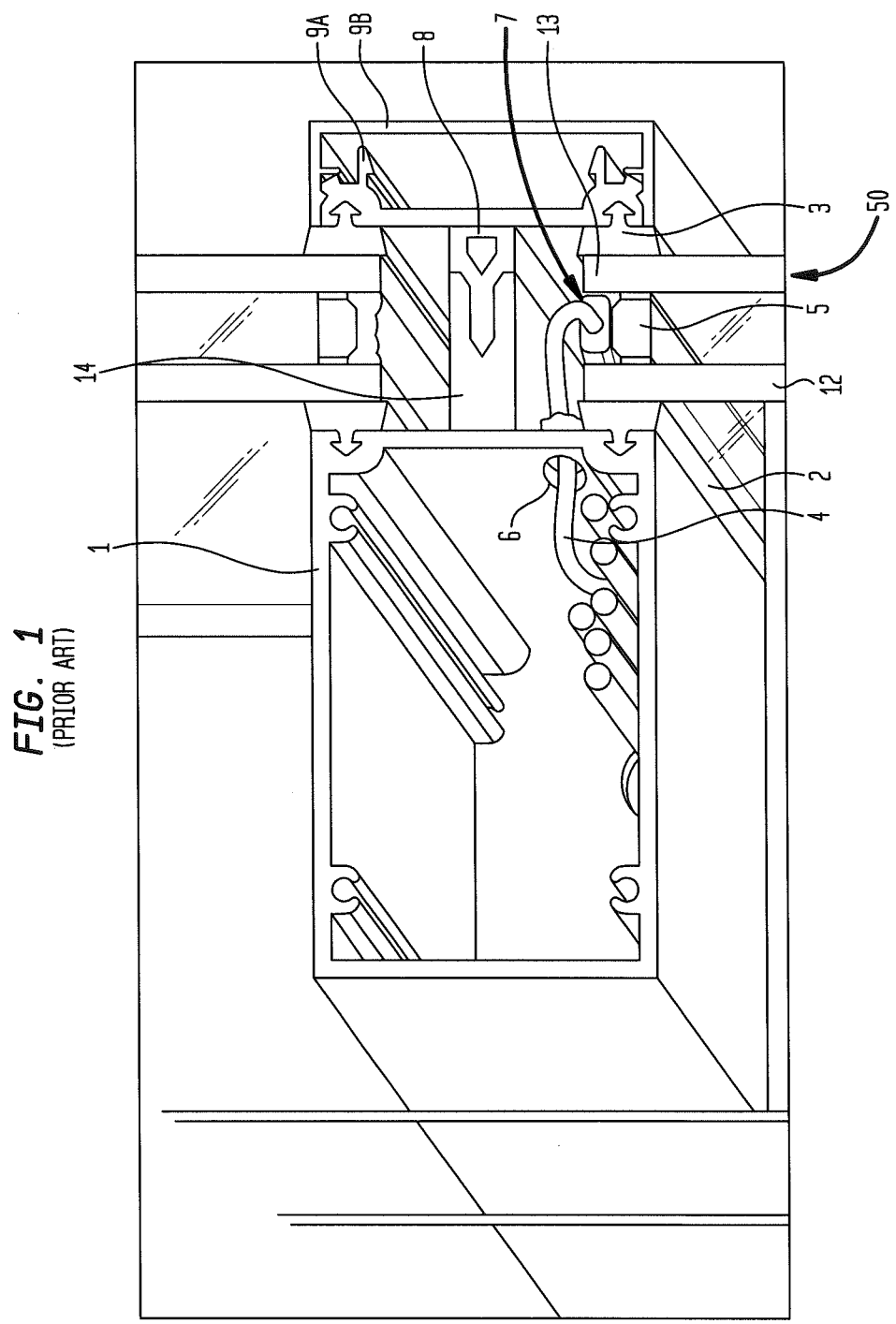
FIG. 1 is a perspective view of an example of an architectural glazing frame system.

It must be noted that the system for providing an electrical interface across a sealed boundary as described previously herein may be used with various types of framing systems. The frame 1 in the example of FIG. 1 is part of a typical commercial framing system termed a "pressure plate" system used for curtain walls and skylights. These types of systems often have IGUs installed from the exterior in which the primary building seal may be the interior most seal, such as the inner seal 2. The pressure plate 9A and pressure plate wall seal 8 and trim cap 9B may also be installed from the exterior.

Figure 16A:
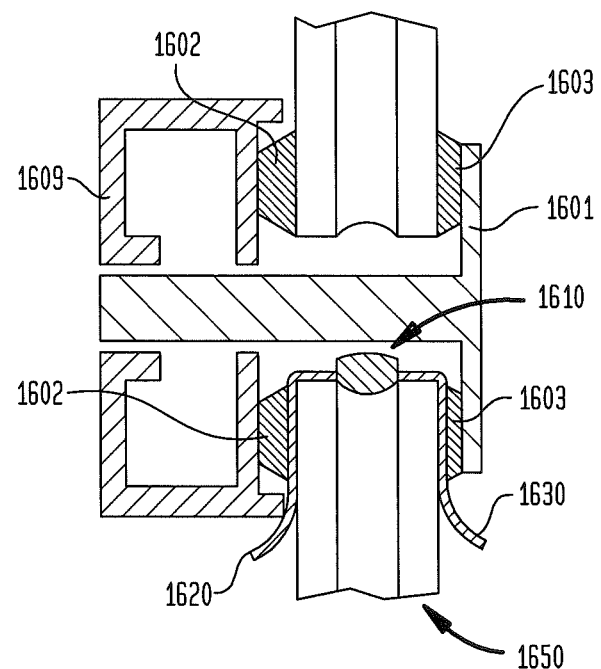
FIG. 16A is a cross-sectional view of a system for providing an electrical interface across a sealed boundary of an architectural glazing frame system in accordance with an embodiment of the invention.

In contrast, in another typical commercial framing system termed a "store front" framing system, such as the framing system shown in FIG. 16A, an IGU is typically installed from the interior. In these systems, a clamp seal 1602 may be seated between a clamp channel 1609 (also known as a clamp plate or IGU plate) and an IGU 1650 on a side of the IGU away from the exterior of the framing system, i.e., an outdoor environment. A frame 1601 may inserted through the clamp channel 1609 between the IGU 1650 and an adjacent IGU. A frame seal 1603 may be seated between the IGU 1650 and the frame 1601 on a side of the IGU 1650 opposite the interface of the IGU 1650 with the clamp seal 1602. In such configurations, the frame seal 1603 may serve as the primary building seal. In this configuration, a connectivity harness 1610 may be placed adjacent to and may be connected to the IGU 1650 within a pocket formed by the intersection of the clamp channel 1609, the outer seal 1603, the frame 1601, and an inner seal 1602 seated between the frame 1601 and the IGU 1650. In a manner similar to the passing of the inner and outer printed circuits 220, 230 through the IGU 50 as shown in the example of FIGS. 4A and 4B, inner and outer printed circuits 1620, 1630 may be passed between the IGU 1650 and the respective inner and outer seals 1602, 1603.

Figure 16B:
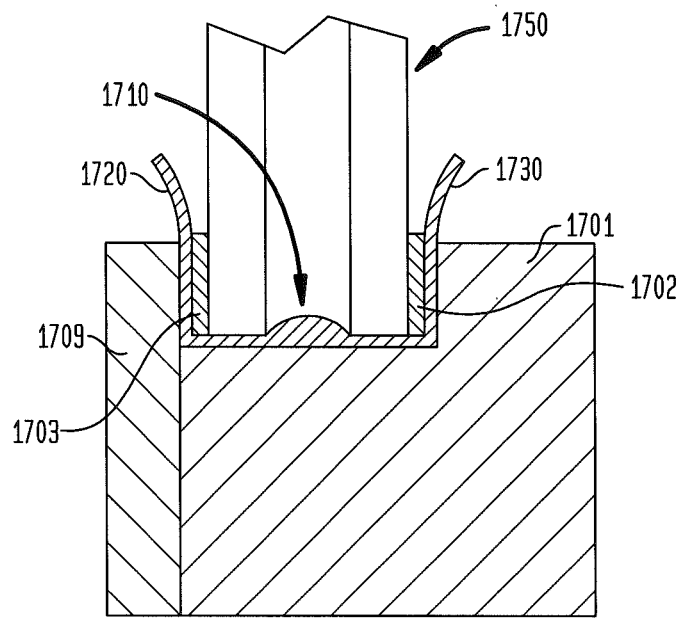
FIG. 16B is a cross-sectional view of a system for providing an electrical interface across a sealed boundary of an architectural glazing frame system in accordance with an embodiment of the invention.

As shown in FIG. 16B, a simple residential framing system, such as the framing system shown in FIG. 16B, may have but is not limited to, hollow channel profile formed by a clamp 1709 pressed against a frame 1701 to maintain upright and surround an edge of an IGU 1750. As the clamp 1709 may be pressed from either of the interior or exterior of the framing system based on a residential window manufacturer's IGU and frame design, a corresponding IGU may be inserted from either of the interior or exterior in such framing systems. Accordingly, the primary building seal location may vary between inside or outside types based on a window manufacturer's designs. In either primary building seal location configuration, first and second printed circuits 1702, 1703 of a connectivity harness 1710 inserted between the frame 1701 and the edge of the IGU 1750 may be passed between the IGU 1750 and the respective first and second printed circuits 1720, 1730. In this manner, as for any of the known architectural framing systems described previously herein, electrical components on opposite sides of the IGU may be electrical connected to one another through the connectivity harness with little or no modification to the structure of the frame.

Figure 17A:
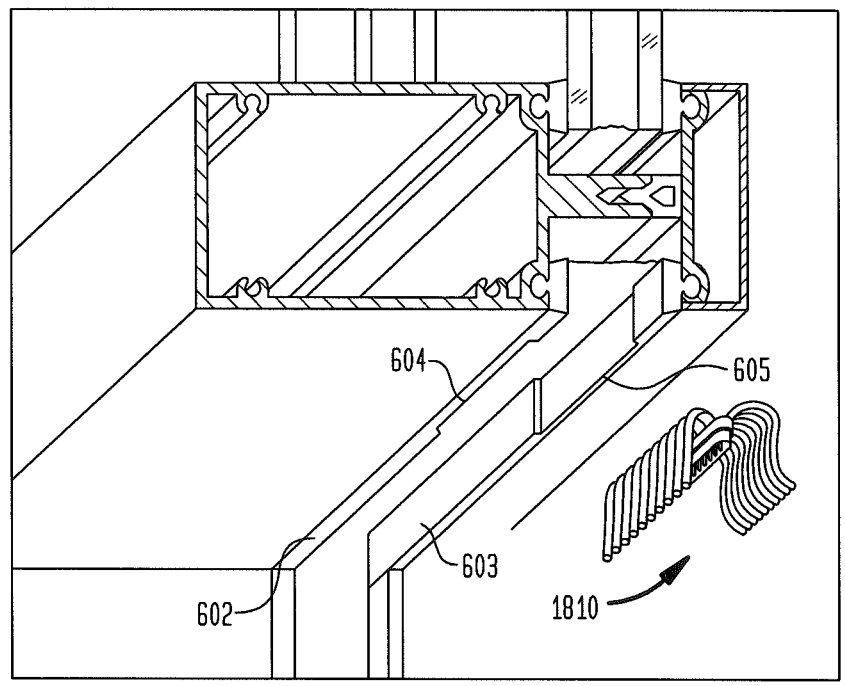
FIG. 17A is a perspective view of portions of a system for providing an electrical interface across a sealed boundary of an architectural glazing frame system in accordance with an embodiment of the invention.

Additionally, any embodiments previously described and illustrated herein may have been described as having electrical connections, such as but not limited to flexible printed circuits, flexible ribbon cables, wires, and collections of wires that pass through any of at least (i) a seal, (ii) a space between a seal and a frame, and (iii) a space between a seal or a substrate, such as a glass lite of an IGU. However, it should be noted that any of these electrical connections may similarly pass at least (i) through a seal, (ii) between a space between a seal and a frame, and (iii) between a space between a seal and a substrate in other embodiments. For example, as shown in FIG. 17A, inner and outer seals 602, 603 may be similar in all respects to inner seal 2 and outer seal 3 as shown in FIG. 1 except that the seals may have respective notches 604, 605 to allow a conduit cable, such as a ribbon cable or printed circuit as described previously herein, to be inserted therein. In some instances, additional sealing mechanisms, such as silicone caulk, may be used in conjunction with the inner and outer seals 602, 603 to seal the interface between the inner and outer seals 602, 603 and an IGU against which the seals may be placed when the notches 604, 605 are too large to compress cables extending from a connectivity harness 1810.

Figure 17B:
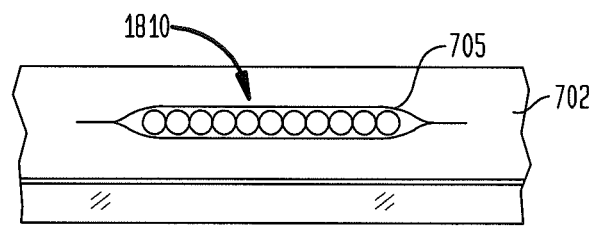
FIG. 17B is a cross-sectional side view of a portion of an architectural glazing frame system in accordance with an embodiment of the invention.

As shown in FIG. 17B, in some embodiments, the cables of the connectivity harness 1810 may be passed through seals such as the seal 702 having a slot 705 extending entirely through the seal 702 along a width of the seal. In such configurations, the seal 702 may provide sufficient sealing against the ribbon of the connectivity harness 1810 when under a compressive load, e.g., when compressed between an IGU and a frame, such that no additional sealing mechanism is required. However, other sealing mechanisms may be used as necessary as described previously herein.

Although the invention herein has been described with reference to particular embodiments, it is to be understood that these embodiments are merely illustrative and not exhaustive of the principles and applications of the present invention. Thus, various features of one embodiment may be interchanged with features of another embodiment disclosed previously herein. For instance, a flexible printed circuit ribbon may be replaced by a flexible ribbon cable or by a standard wire or collection of wires which may have been illustrated with respect to one embodiment herein. It is therefore to be understood that numerous modifications may be made to the illustrative embodiments and that other arrangements may be devised without departing from the spirit and scope of the present invention as defined by the appended claims.

The invention claimed is:

1. A system for providing an electrical interface across a sealed boundary comprising:
    a frame in sealed engagement with at least a portion of a substrate through first and second seals on both the first and second sides of the substrate, the substrate being in communication with an electrochromic device; and
    first and second conduits, wherein the first conduit is on a first side of the substrate nearest to a first seal and a second conduit is on a second side of the substrate nearest to a second seal, wherein the second conduit is in communication with the first conduit through any of (i) the first and second seals, (ii) spaces between each of the first and second seals and the frame, and (iii) spaces between each of the first and second seals and the substrate.

2. The system of claim 1, wherein the first and second conduits are ends of a connecting harness.

3. The system of claim 1, further comprising at least one conduit cable, wherein at least one of the first and second conduits form at least an end portion of the at least one conduit cable.

4. The system of claim 3, wherein the at least one conduit cable is in sealed engagement with one of the first and second seals.

5. The system of claim 4, the substrate having a recess at a portion of the perimeter of the substrate adapted for engagement with the at least one conduit cable, wherein the at least one conduit cable is in sealed engagement with the one of the first and second seals at the substrate recess.

6. The system of claim 3, further comprising two conduit cables, each of the conduit cables passing through one of (i) the respective first or second seal, (ii) the space between the respective first or second seal and the frame, and (iii) the space between the respective first or second seal and the substrate.

7. The system of claim 3, wherein the at least one conduit cable is a flexible ribbon cable.

8. The system of claim 7, wherein the flexible ribbon cable has a thickness ranging from about 0.035 to about 0.040 inches across a width thereof.

9. The system of claim 3, wherein the at least one conduit cable is a flexible printed circuit.

10. The system of claim 9, wherein the flexible printed circuit is substantially flat having a consistent thickness ranging from about 0.008 to about 0.015 inches across a width thereof.

11. The system of claim 3, wherein the at least one conduit cable is formed of multiple layers.

12. The system of claim 11, wherein the at least one conduit cable comprises a stepped edge.

13. The system of claim 3, wherein the at least one conduit cable has a tapered edge on an end thereof.

14. The system of claim 13, wherein the tapered edge comprises a tip at an extremity of the edge, wherein the tip of the tapered edge is in sealed engagement with the substrate.

15. The system of claim 1, wherein the first and second conduits are connected through a connectivity module.

16. The system of claim 15, wherein the connectivity module is connected to the electrochromic device through a cable connection.

17. The system of claim 15, wherein the connectivity module is connected to the electrochromic device through a connector socket extending from the connectivity module.

18. A system for providing an electrical interface across a sealed boundary comprising:
    a frame in sealed engagement along at least a portion of a substrate, the substrate being in communication with an electrochromic device;
    a connectivity module adapted for connection to the electrochromic device; and
    first and second conduits, wherein the first conduit is on a first side of the substrate and a second conduit is on the second side of the substrate, wherein the second conduit is in communication with the first conduit through a first hole in the substrate,
    wherein the connectivity module has (i) a second hole for receiving at least one electrical element for connecting the first and second conduits or (ii) opposing first and second connectors for receiving electrical elements in electrical communication with the first and second conduits, respectively.

19. A system for providing an electrical interface between components outside of a building and components inside of a building, a portion thereof being enclosed by at least one insulated glass unit having first and second glass substrates and an electrochromic device attached there between, said system comprising:
    a building frame in sealed engagement with first and second opposing sides of the glass substrates along a length of the substrates through seals simultaneously engaged with said frame and the substrate;
    at least a first conduit on said first opposing side of the first glass substrate, said at least one first conduit being at least one of (i) a flexible ribbon cable, (ii) a flexible printed circuit cable, and (iii) a conventional wire cable, said first conduit being adapted for connection to a photovoltaic panel connector head on one end and a central connector on an opposite end, and said first conduit being configured to transmit or receive an electrical signal;
    at least a second conduit on said second opposing side of the second glass substrate, said at least one second conduit being at least one of (i) a flexible ribbon cable, (ii) a flexible printed circuit cable, and (iii) a conventional wire cable, said second conduit being adapted for connection to an electronic control unit on one end and said central connector on an opposite end, and said at least one second conduit being configured to transmit an electrical signal to, or receive an electrical signal from, said at least one first conduit through at least one of (i) said seals, (ii) a space between said seals and said frame, and (iii) a space between said seals and said substrates,
    wherein said central connector contacts at least a portion of outer faces of the first and second glass substrates, said outer faces being adjacent to the first and second opposing sides and said central connector having a width with tapered edges at each end of said width, the tapered edges being adapted to contact said outer faces such that said central connector substantially forms a seal along the width thereof with both of said outer faces.

* * * * *